US010564770B1

United States Patent
Keeler et al.

(10) Patent No.: US 10,564,770 B1
(45) Date of Patent: Feb. 18, 2020

(54) PREDICTIVE TOUCH DETECTION

(71) Applicant: Apple Inc., Cupertino, CA (US)

(72) Inventors: Kevin M. Keeler, Saratoga, CA (US); Brian C. Menzel, Monte Sereno, CA (US); Alvin J. Hilario, Los Altos, CA (US); Randal Marsden, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 268 days.

(21) Appl. No.: 15/178,382

(22) Filed: Jun. 9, 2016

Related U.S. Application Data

(60) Provisional application No. 62/173,315, filed on Jun. 9, 2015.

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04101* (2013.01)

(58) Field of Classification Search
CPC . G06F 2203/04101; G06F 2203/04108; G06F 3/0416; G06F 3/044
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,543,587 A | 8/1996 | Ikura et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |

(Continued)

FOREIGN PATENT DOCUMENTS

| | | |
|---|---|---|
| EP | 2 230 589 A1 | 9/2010 |
| JP | 2000-163031 A | 6/2000 |
| JP | 2002-342033 A | 11/2002 |

OTHER PUBLICATIONS

Notice of Allowance dated Sep. 22, 2017, for U.S. Appl. No. 12/895,671, filed Sep. 30, 2010, 8 pages.

(Continued)

*Primary Examiner* — Hong Zhou
(74) *Attorney, Agent, or Firm* — Kubota & Basol LLP

(57) ABSTRACT

A touch controller is disclosed. The touch controller can comprise sense circuitry configured to sense an object at a touch sensor panel, and a touch processor. The touch processor can be capable of, when the object is a first distance from the touch sensor panel, determining a predicted touch location associated with the object on the touch sensor panel based on at least a trajectory of the object towards the touch sensor panel, and when the object is a second distance from the touch sensor panel, less than the first distance, determining an identified touch location associated with the object on the touch sensor panel based on at least the predicted touch location.

21 Claims, 12 Drawing Sheets

(56) References Cited

U.S. PATENT DOCUMENTS

| | | | |
|---|---|---|---|
| 8,462,110 | B2 | 6/2013 | Pathangay et al. |
| 8,479,122 | B2 | 7/2013 | Hotelling et al. |
| 8,482,536 | B1 | 7/2013 | Young |
| 8,723,825 | B2 | 5/2014 | Wright et al. |
| 8,780,072 | B2 | 7/2014 | Oda et al. |
| 9,851,829 | B2 | 12/2017 | King et al. |
| 2005/0001824 | A1 | 1/2005 | Yoshimura |
| 2005/0078095 | A1 | 4/2005 | Ung et al. |
| 2005/0104867 | A1 | 5/2005 | Westerman et al. |
| 2006/0026535 | A1 | 2/2006 | Hotelling et al. |
| 2006/0092142 | A1 | 5/2006 | Gillespie et al. |
| 2006/0136845 | A1 | 6/2006 | Rimas-Ribikauskas et al. |
| 2006/0197753 | A1 | 9/2006 | Hotelling |
| 2006/0214926 | A1 | 9/2006 | Kolmykov-Zotov et al. |
| 2006/0244733 | A1 | 11/2006 | Geaghan |
| 2008/0041639 | A1 | 2/2008 | Westerman et al. |
| 2008/0122798 | A1 | 5/2008 | Koshiyama et al. |
| 2008/0174321 | A1 | 7/2008 | Kang et al. |
| 2008/0226134 | A1 | 9/2008 | Stetten et al. |
| 2008/0231926 | A1 | 9/2008 | Klug et al. |
| 2008/0244468 | A1 | 10/2008 | Nishihara et al. |
| 2008/0246723 | A1 | 10/2008 | Baumbach |
| 2008/0278450 | A1 | 11/2008 | Lashina |
| 2009/0219255 | A1 | 9/2009 | Woolley et al. |
| 2009/0225043 | A1 | 9/2009 | Rosener |
| 2009/0237763 | A1 | 9/2009 | Kramer et al. |
| 2009/0309851 | A1 | 12/2009 | Bernstein |
| 2010/0090964 | A1 | 4/2010 | Soo et al. |
| 2010/0245286 | A1 | 9/2010 | Parker |
| 2011/0018811 | A1* | 1/2011 | Miernik .............. G06F 3/0416 345/173 |
| 2011/0083089 | A1* | 4/2011 | Pahud .............. G06F 3/0425 715/765 |
| 2011/0163992 | A1 | 7/2011 | Cordeiro et al. |
| 2012/0019488 | A1 | 1/2012 | McCarthy |
| 2012/0050181 | A1 | 3/2012 | King et al. |
| 2012/0056849 | A1* | 3/2012 | Kasahara .............. G06F 3/044 345/174 |
| 2012/0120002 | A1* | 5/2012 | Ota .............. G06F 3/044 345/173 |
| 2013/0181924 | A1* | 7/2013 | Hong .............. G06F 3/0412 345/173 |
| 2013/0342459 | A1* | 12/2013 | Karakotsios .......... G06F 3/0418 345/159 |
| 2013/0346896 | A1* | 12/2013 | Missout .............. G06F 9/448 715/769 |
| 2014/0025263 | A1* | 1/2014 | Geyer .............. B60K 35/00 701/49 |
| 2014/0028557 | A1* | 1/2014 | Otake .............. G02F 1/13338 345/158 |
| 2014/0204036 | A1 | 7/2014 | Schillings et al. |
| 2014/0267121 | A1 | 9/2014 | Luo |
| 2015/0123929 | A1* | 5/2015 | Bang .............. G06F 3/0488 345/173 |

OTHER PUBLICATIONS

Final Office Action dated Feb. 27, 2014, for U.S. Appl. No. 12/895,671, filed Sep. 30, 2010, 15 pages.

Final Office Action dated Jan. 4, 2016, for U.S. Appl. No. 12/895,671, filed Sep. 30, 2010, 15 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Aug. 2, 2013, for U.S. Appl. No. 12/895,671, filed Sep. 30, 2010, 14 pages.

Non-Final Office Action dated Mar. 19, 2015, for U.S. Appl. No. 12/895,671, filed Sep. 30, 2010, 14 pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

U.S. Appl. No. 12/501,382, filed Jul. 10, 2009, by Bernstein et al.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action dated Jan. 12, 2017, for U.S. Appl. No. 12/895,671, filed Sep. 30, 2010, 14 pages.

* cited by examiner

PREDICTIVE TOUCH DETECTION

CROSS-REFERENCE TO RELATED APPLICATION

This application claims the benefit under 35 U.S.C. § 119(e) of U.S. Provisional Patent Application No. 62/173,315, filed Jun. 9, 2015, the content of which is incorporated by reference herein in its entirety for all purposes.

FIELD OF THE DISCLOSURE

This relates generally to touch sensor panels, and more particularly, to predicting a touch location on a touch sensor panel.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of substantially transparent or non-transparent conductive plates made of materials such as Indium Tin Oxide (ITO). It is due in part to their substantial transparency that capacitive touch sensor panels can be overlaid on a display to form a touch screen, as described above. Some touch screens can be formed by at least partially integrating touch sensing circuitry into a display pixel stackup (i.e., the stacked material layers forming the display pixels).

SUMMARY OF THE DISCLOSURE

Some capacitive touch sensor panels can be formed by a matrix of substantially transparent or non-transparent conductive plates made of materials such as Indium Tin Oxide (ITO), and some touch screens can be formed by at least partially integrating touch sensing circuitry into a display pixel stackup (i.e., the stacked material layers forming the display pixels). Fingers or objects that touch or come in proximity to the touch screen of the disclosure can sometimes be relatively large. For example, if a keyboard is displayed on the touch screen, a finger that is touching the touch screen to select a key from the keyboard can be two or three times the size of the keys of the keyboard, and can cover two or more keys when touching the touch screen. In some examples, a centroid of the touch on the touch screen can be calculated to determine where the touch location of the relatively large finger should be identified (and thus which key of the keyboard has been selected, for example). However, the centroid of the touch may not accurately reflect the intended touch location of the user. For example, the user's finger may have inadvertently moved immediately prior to touchdown (e.g., due to a bumpy road or turbulence in an airplane while touching the touch screen). Thus, in some examples, the trajectory of the finger as it approaches the touch screen (before touching or coming within a predefined proximity of the touch screen) can be tracked to predict the user's intended touch location, and provide a more accurate touch experience for the user.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent or non-transparent conductive plates made of materials such as Indium Tin Oxide (ITO), and some touch screens can be formed by at least partially integrating touch sensing circuitry into a display pixel stackup (i.e., the stacked material layers forming the display pixels). Fingers or objects that touch or come in proximity to the touch screen of the disclosure can sometimes be relatively large. For example, if a keyboard is displayed on the touch screen, a finger that is touching the touch screen to select a key from the keyboard can be two or three times the size of the keys of the keyboard, and can cover two or more keys when touching the touch screen. In some examples, a centroid of the touch on the touch screen can be calculated to determine where the touch location of the relatively large finger should be identified (and thus which key of the keyboard has been selected, for example). However, the centroid of the touch may not accurately reflect the intended touch location of the user. For example, the user's finger may have inadvertently moved immediately prior to touchdown (e.g., due to a bumpy road or turbulence in an airplane while touching the touch screen). Thus, in some examples, the trajectory of the finger as it approaches the touch screen (before touching or coming within a predefined proximity of the touch screen) can be tracked to predict the user's intended touch location, and provide a more accurate touch experience for the user.

Figure 1A:
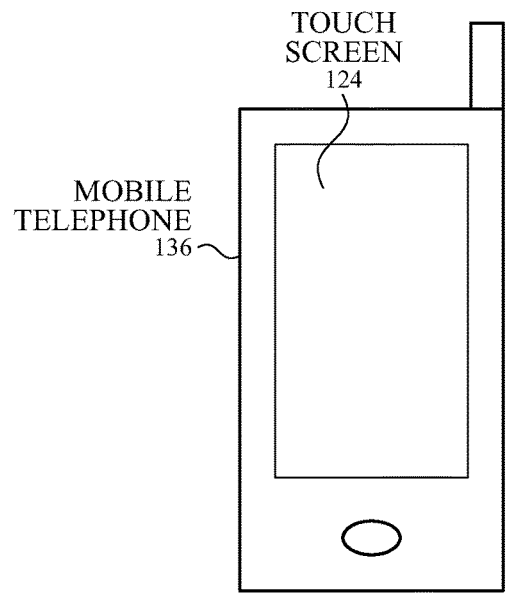
FIGS. 1A-1D illustrate an example mobile telephone, an example media player, an example personal computer and an example tablet computer that can each include an exemplary touch screen according to examples of the disclosure.
Figure 1B:
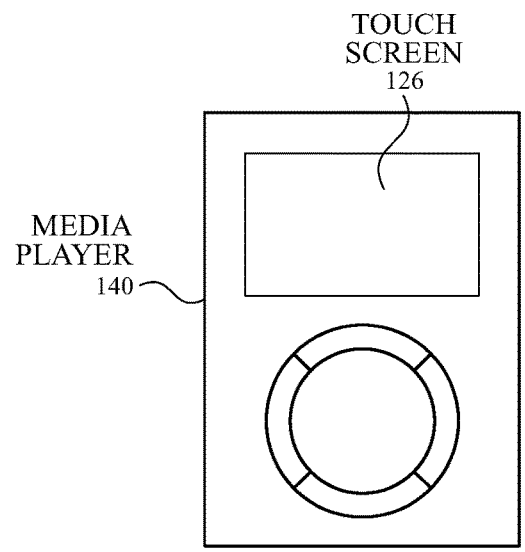
Figure 1C:
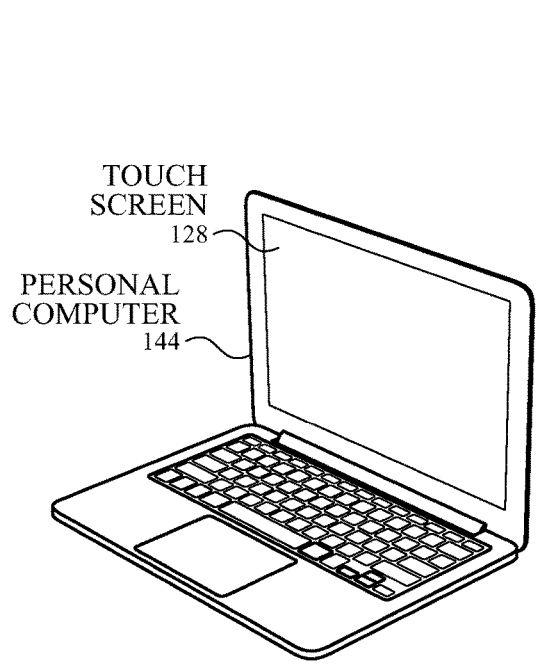
Figure 1D:
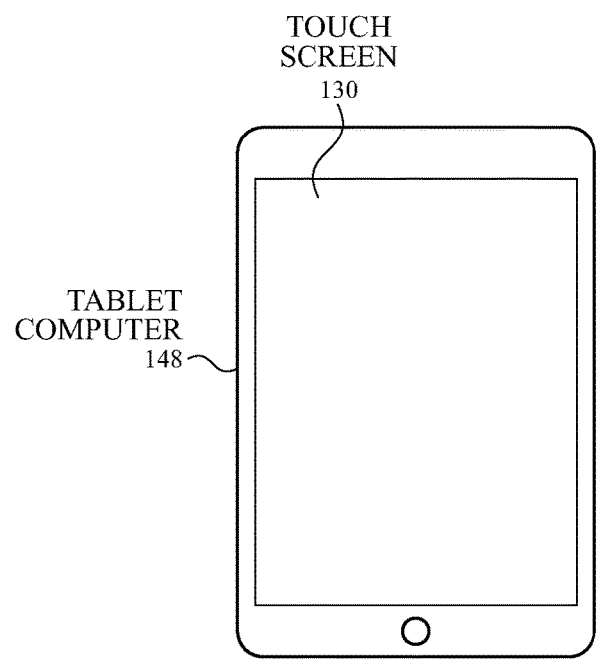

FIGS. 1A-1D illustrate example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. It is understood that the above touch screens can be implemented in other devices as well, including in wearable devices.

In some examples, touch screens 124, 126, 128 and 130 can be based on self-capacitance. A self-capacitance based touch system can include a matrix of small, individual plates of conductive material that can be referred to as touch node electrodes (as described below with reference to touch screen 220 in FIG. 2). For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change. This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128 and 130 can be based on mutual capacitance. A mutual capacitance based touch system can include drive and sense lines that may cross over each other on different layers, or may be adjacent to each other on the same layer. The crossing or adjacent locations can be referred to as touch nodes. During operation, the drive line can be stimulated with an AC waveform and the mutual capacitance of the touch node can be measured. As an object approaches the touch node, the mutual capacitance of the touch node can change. This change in the mutual capacitance of the touch node can be detected and measured by the touch sensing system to determine the positions of multiple objects when they touch, or come in proximity to, the touch screen.

Figure 2:
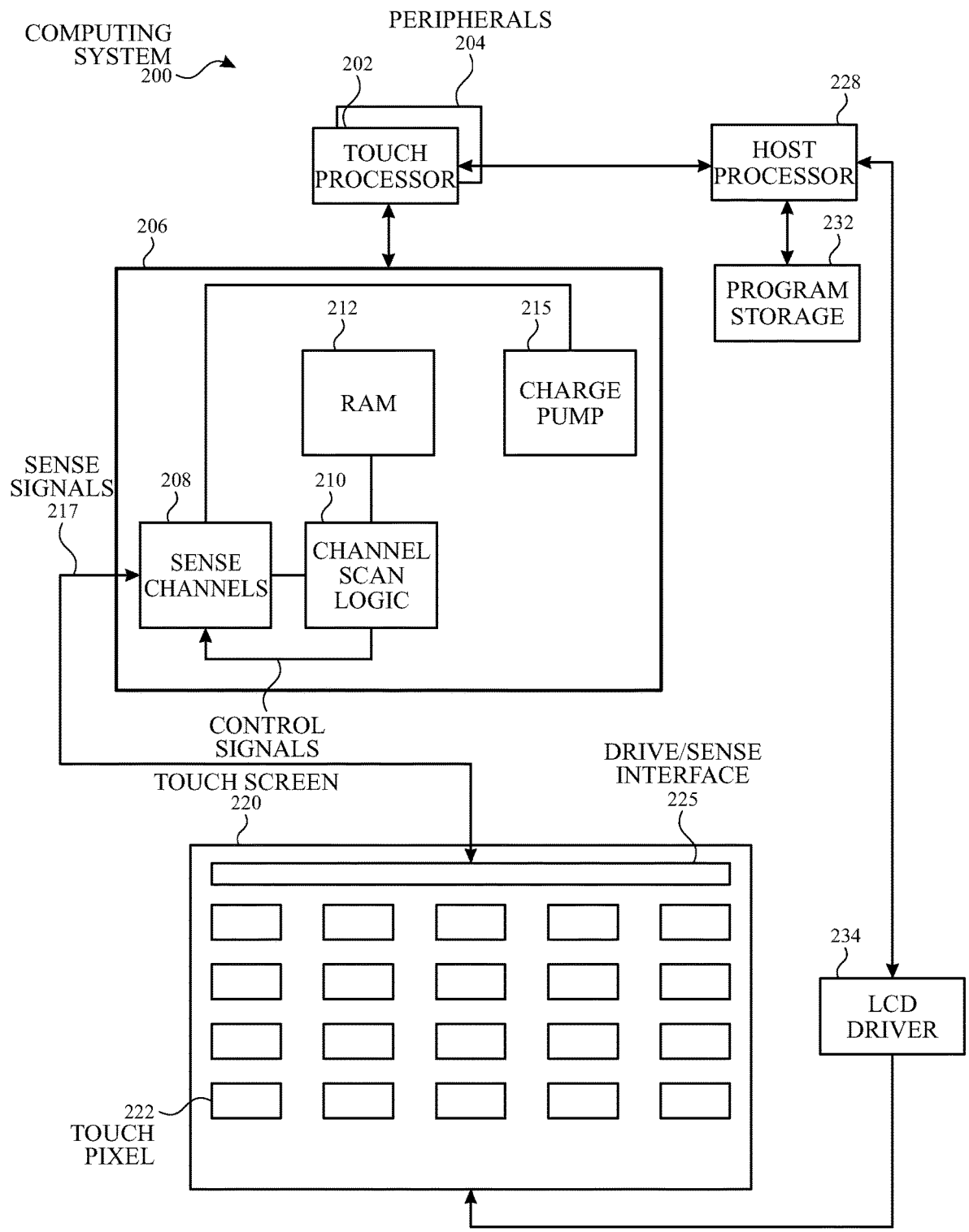
FIG. 2 is a block diagram of an example computing system that illustrates one implementation of an example self-capacitance touch screen according to examples of the disclosure.

FIG. 2 is a block diagram of an example computing system 200 that illustrates one implementation of an example self-capacitance touch screen 220 according to examples of the disclosure. It is understood that computing system 200 can instead include a mutual capacitance touch screen, as described above, though the examples of the disclosure will be described assuming a self-capacitance touch screen is provided. Computing system 200 can be included in, for example, mobile telephone 136, digital media player 140, personal computer 144, tablet computer 148, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch nodes of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can include touch sensing circuitry that can include a capacitive sensing medium having a plurality of electrically isolated touch node electrodes 222 (e.g., a pixelated self-capacitance touch screen). Touch node electrodes 222 can be coupled to sense channels 208 in touch controller 206, can be driven by stimulation signals from the sense channels through drive/sense interface 225, and can be sensed by the sense channels through the drive/sense interface as well, as described above. Labeling the conductive plates used to detect touch (i.e., touch node electrodes 222) as "touch node" electrodes can be particularly useful when touch screen 220 is viewed as capturing an "image" of touch (e.g., a "touch image"). In other words, after touch controller 206 has determined an amount of touch detected at each touch node electrode 222 in touch screen 220, the pattern of touch node electrodes in the touch screen at which a touch occurred can be thought of as a touch image (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (e.g., gate) lines to each pixel transistor and can provide data signals along data lines to these same transistors to control the pixel display image as described in more detail below. Host processor 228 can use LCD driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3A:
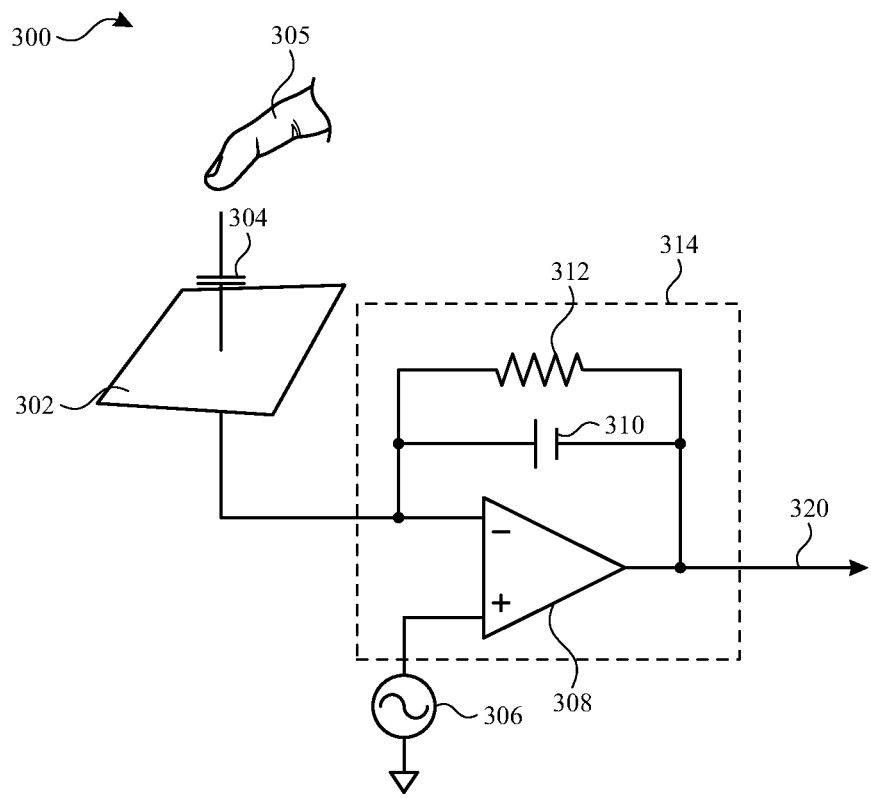
FIG. 3A illustrates an exemplary touch sensor circuit corresponding to a self-capacitance touch node electrode and sensing circuit according to examples of the disclosure.

FIG. 3A illustrates an exemplary touch sensor circuit 300 corresponding to a self-capacitance touch node electrode 302 and sensing circuit 314 according to examples of the disclosure. Touch node electrode 302 can correspond to touch node electrode 222. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
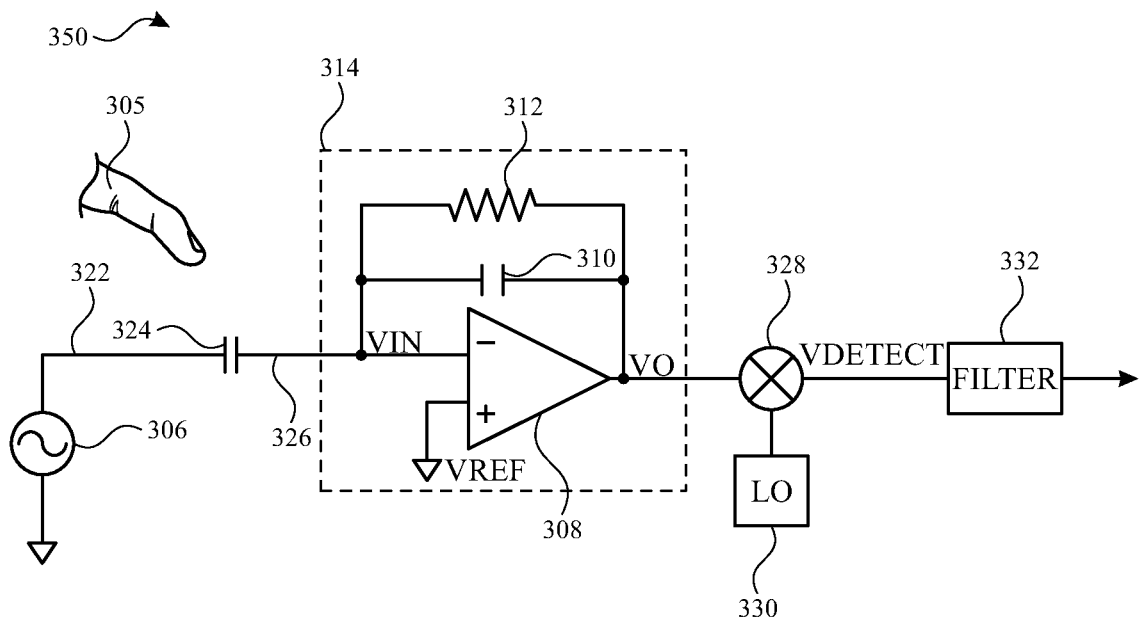
FIG. 3B illustrates an exemplary touch sensor circuit corresponding to a mutual-capacitance drive and sense line and sensing circuit according to examples of the disclosure.

FIG. 3B illustrates an exemplary touch sensor circuit 350 corresponding to a mutual-capacitance drive 322 and sense 326 line and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can be altered. This change in mutual capacitance 324 can be detected to indicate a touch or proximity event at the touch node, as described previously and below. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays, such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4:
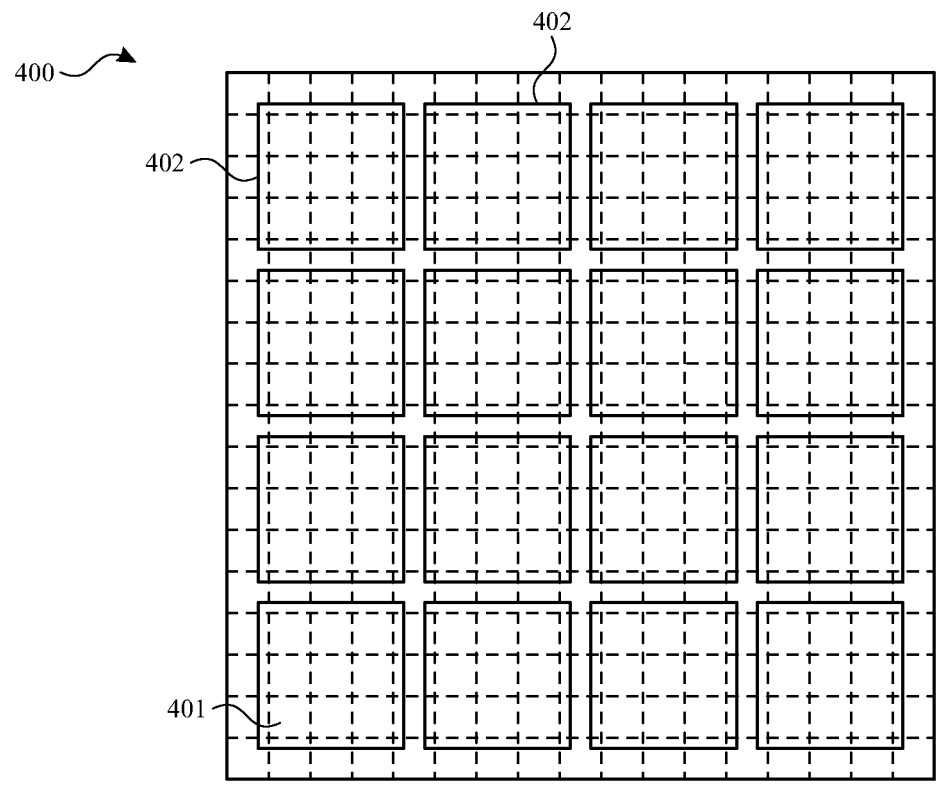
FIG. 4 illustrates an example configuration in which common electrodes can form portions of the touch sensing circuitry of a touch sensing system according to examples of the disclosure.

FIG. 4 illustrates an example configuration in which common electrodes 402 can form portions of the touch sensing circuitry of a touch sensing system—in some examples of this disclosure, the common electrodes can form touch node electrodes used to detect a touch image on touch screen 400, as described above. Each common electrode 402 can include a plurality of display pixels 401, and each display pixel 401 can include a portion of a common electrode 402, which can be a circuit element of the display system circuitry in the display pixel stackup (i.e., the stacked material layers forming the display pixels) of the display pixels of some types of LCDs or other displays—in other words, the common electrodes can operate as part of the display system to display a display image on touch screen 400.

In the example shown in FIG. 4, each common electrode 402 can serve as a multi-function circuit element that can operate as display circuitry of the display system of touch screen 400 and can also operate as touch sensing circuitry of the touch sensing system. Specifically, each common electrode 402 can operate as a common electrode of the display circuitry of the touch screen 400 (e.g., during a display phase), as described above, and can also operate as a touch node electrode of the touch sensing circuitry of the touch screen (e.g., during a touch sensing phase). Other circuit elements of touch screen 400 can also form part of the touch sensing circuitry. More specifically, in some examples, during the touch sensing phase, a gate line can be connected to a power supply, such as a charge pump, that can apply a voltage to maintain TFTs in display pixels included in a common electrode 402 in an "off" state. Stimulation signals can be applied to the common electrode 402. Changes in the total self-capacitance of the common electrode 402 can be sensed through one or more operational amplifiers, as previously discussed. The changes in the total self-capacitance of the common electrode 402 can depend on the proximity of an object, such as finger 305, to the common electrode. In this way, the measured changes in total self-capacitance of the common electrode 402 can provide an indication of touch on or near the touch screen. A mutual capacitance touch screen can similarly be implemented in which common electrodes can form portions of the touch sensing circuitry of the mutual capacitance touch screen. For example the common electrodes can form drive or sense lines used to detect a touch image on the touch screen, as described above.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

In addition, although examples herein may describe the display circuitry as operating during a display phase, and describe the touch sensing circuitry as operating during a touch sensing phase, it should be understood that a display phase and a touch sensing phase may be operated at the same time, e.g., partially or completely overlapping, or the display phase and touch sensing phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

The common electrodes 402 (i.e., touch node electrodes) and display pixels 401 of FIG. 4 are shown as rectangular or square regions on touch screen 400. However, it is understood that the common electrodes 402 and display pixels 401 are not limited to the shapes, orientations, and positions shown, but can include any suitable configurations according to examples of the disclosure. Further, the examples of the disclosure will be provided in the context of a touch screen, but it is understood that the examples of the disclosure can similarly be implemented in the context of a touch sensor panel.

Fingers or objects that touch or come in proximity to the touch screen of the disclosure can sometimes be relatively large. For example, if a keyboard is displayed on the touch screen, a finger that is touching the touch screen to select a key from the keyboard can be two or three times the size of the keys of the keyboard, and can cover two or more keys when touching the touch screen. In some examples, a centroid of the touch on the touch screen can be calculated to determine where the touch location of the relatively large finger should be identified (and thus which key of the keyboard has been selected, for example). However, the centroid of the touch may not accurately reflect the intended touch location of the user. For example, the user's finger may have inadvertently moved immediately prior to touchdown (e.g., due to a bumpy road or turbulence in an airplane while touching the touch screen). Thus, in some examples, the trajectory of the finger as it approaches the touch screen (before touching or coming within a predefined proximity of the touch screen) can be tracked to predict the user's intended touch location, and provide a more accurate touch experience for the user.

Figure 5:
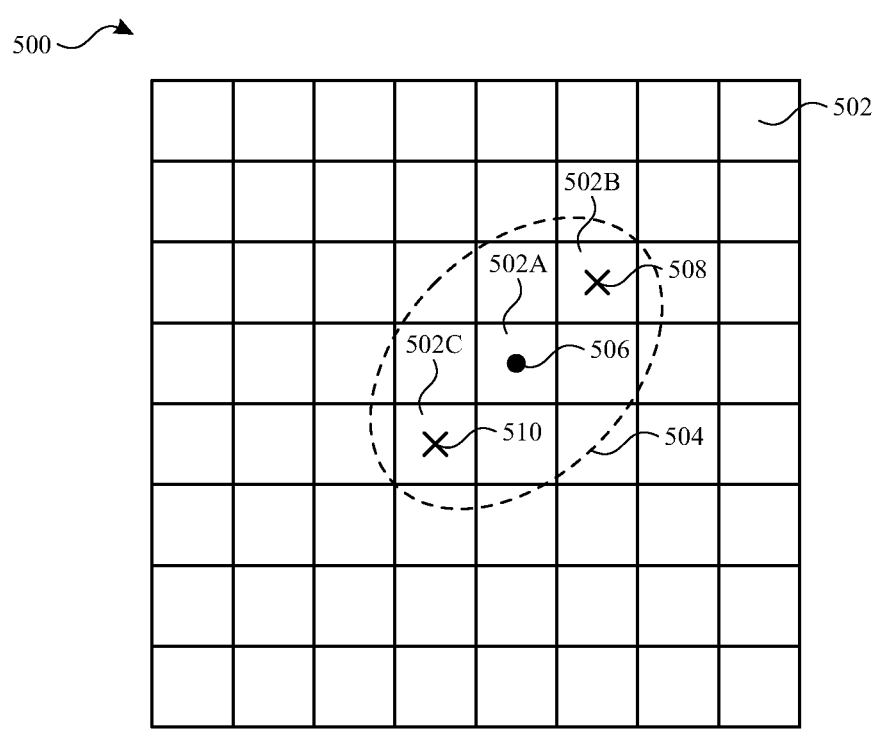
FIG. 5 illustrates an exemplary capacitance profile detected on a touch screen according to examples of the disclosure.

FIG. 5 illustrates an exemplary capacitance profile 504 detected on touch screen 500 according to examples of the disclosure. Touch screen 500 can include touch node electrodes 502, including touch node electrodes 502a, 502b and 502c, as previously described, though it is understood that the touch node electrodes in the figure can represent touch nodes for touch screens other that pixelated self-capacitance touch screens (e.g., mutual capacitance touch screen touch nodes). Touch screen 500 can detect capacitance profile 504. Capacitance profile 504 can correspond to a finger or object touching or in proximity to touch screen 500. As previously described, in some examples, centroid 506 of capacitance profile 504 can be calculated to determine the touch location corresponding to the capacitance profile; in the illustrated example, the centroid can coincide with touch node electrode 502a. However, centroid 506 may not accurately reflect the intended touch location of the user. In some examples, touch location 508 (corresponding to touch node electrode 502b) may more accurately reflect the user's intended touch location, or touch location 510 (corresponding to touch node electrode 502c) may more accurately reflect the user's intended touch location. Tracking and predicting the trajectory of the finger or object as it approaches touch screen 500 can facilitate a more accurate determination of the user's intended touch location, as will be described below.

Figure 6A:
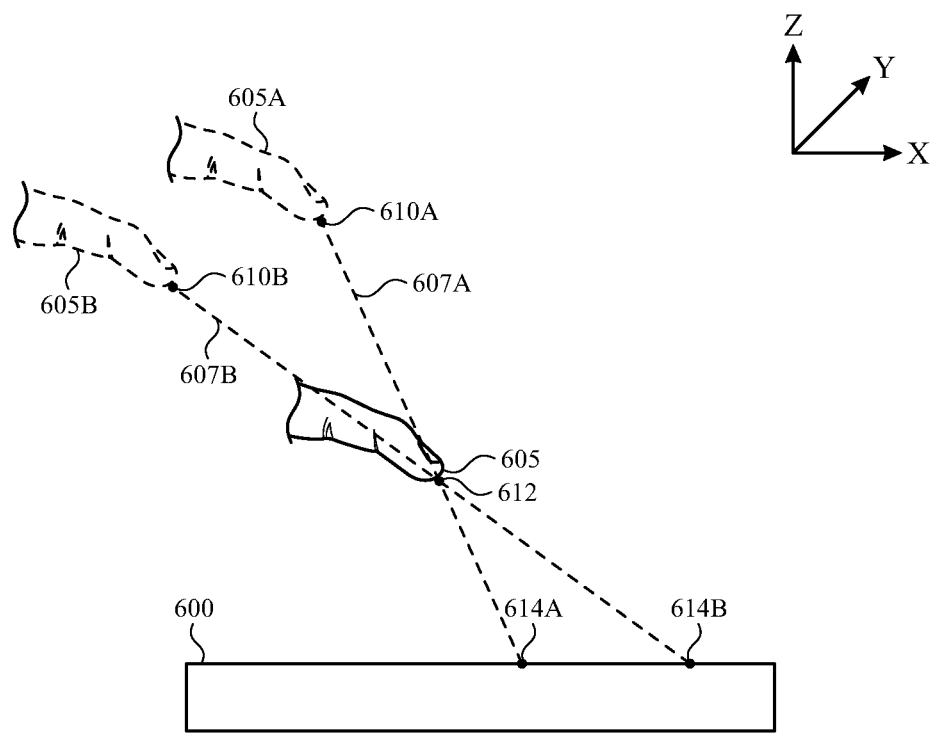
FIGS. 6A-6C illustrate exemplary tracking and prediction of the trajectory of a finger according to examples of the disclosure.
Figure 6B:
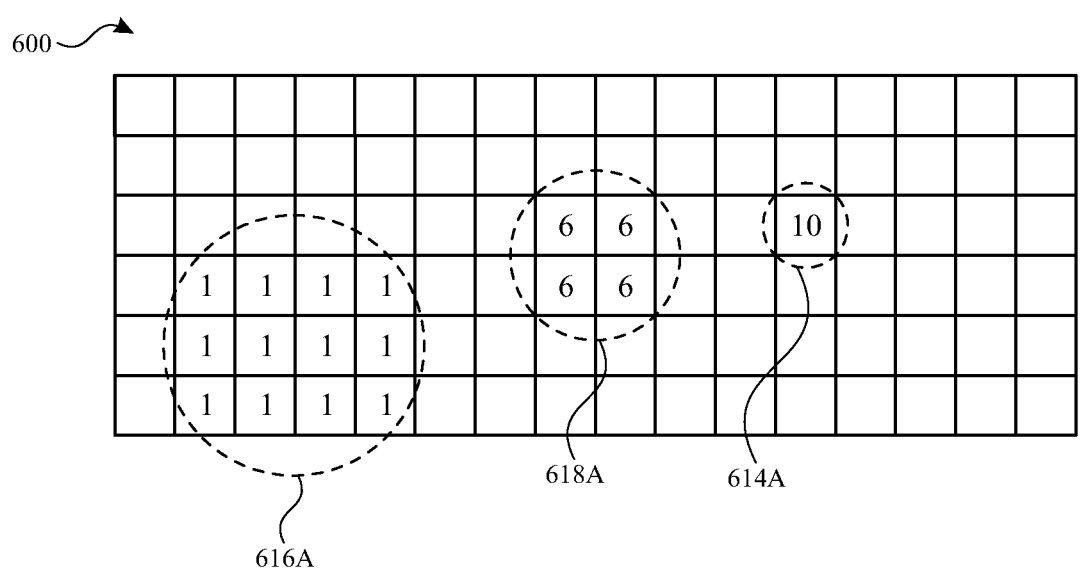
Figure 6C:
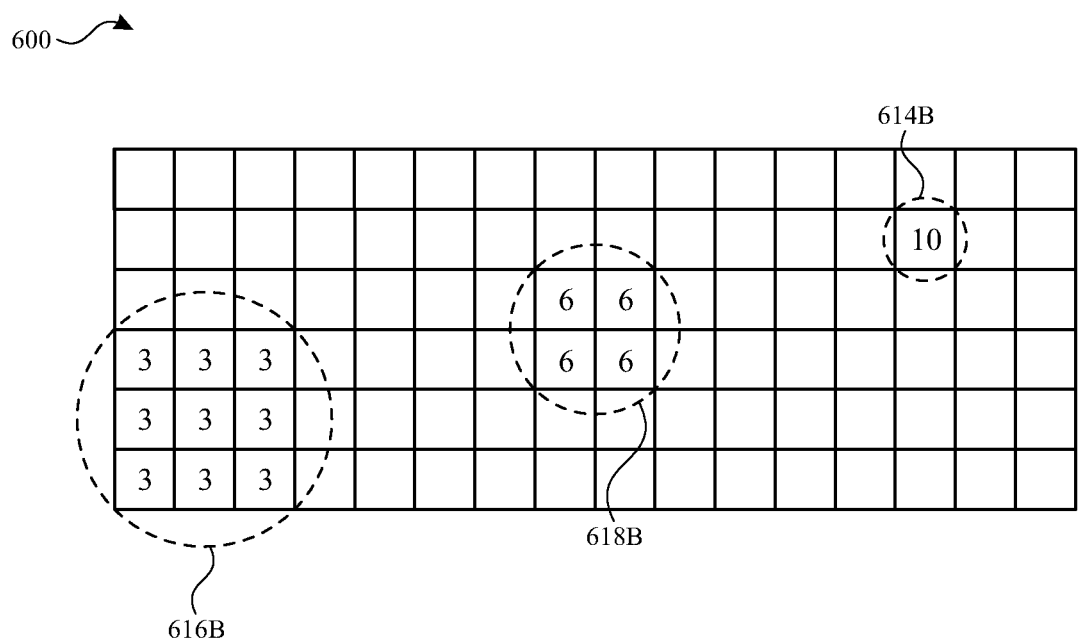

FIGS. 6A-6C illustrate exemplary tracking and prediction of the trajectory of finger 605 according to examples of the disclosure. FIG. 6A illustrates two exemplary trajectories 607a and 607b of two exemplary fingers 605a and 605b according to examples of the disclosure. Finger 605a can be approaching touch screen 600 at a steeper angle and with a greater z-velocity (velocity along the z-axis perpendicular to the surface of the touch screen) than finger 605b, which can be approaching the touch screen at a shallower angle and with a lower z-velocity than finger 605a. However, for the purpose of the illustrated examples, fingers 605a and 605b can both be located at position 612 before touching touch screen 600, and can both have substantially the same velocity in the plane of the touch screen (e.g., substantially the same x-y velocity).

Focusing first on finger 605a, the trajectory that finger 605a followed to arrive at position 612 can be determined when finger 605a arrives at position 612 (or could have been being tracked before finger 605a arrived at position 612). For example, finger 605a could have moved from position 610a to position 612 along trajectory 607a. The touch sensing system in some examples of the disclosure (e.g., as illustrated in FIG. 2) can detect or otherwise obtain most or all of the parameters required to determine most or all of the quantities required to track or determine trajectory 607a. For example, the capacitance profile of finger 605a as it moves closer to touch screen 600 can be tracked and utilized to determine finger 605a's position, velocity and acceleration in three dimensions over time (e.g., along the x, y and z axes). Changes in the x and y position of finger 605a from position 610a to position 612 can be utilized to determine finger 605a's velocity along the x and y axes (i.e., in the plane of touch screen 600), and changes in the intensity of finger 605a's capacitance profile from position 610a to position 612 can be utilized to determine finger 605a's velocity along the z axis (towards the touch screen), for example. In some examples, some of the parameters can be retrieved from memory or assumed as constant values.

Based on the trajectory that finger 605a followed to arrive at position 612 and/or the above velocity determinations or other data, predicted location 614a can be extrapolated as the location at which finger 605a is predicted to touchdown on touch screen 600 (and thus can be designated as the predicted touch location for finger 605a). The above trajectories and extrapolations can take any appropriate form, such as linear trajectories and extrapolations or non-linear trajectories and extrapolations (e.g., spline-based trajectories and extrapolations). Trajectory 607a of finger 605a can continue to be tracked, and predicted location 614a can continue to be determined, until finger 605a touches down on touch screen 600, at which point predicted location 614a can be used as the touch location of finger 605a (instead of, for example, the centroid of finger 605a). It is understood that in some examples, predicted location 614a can be a point or an area on touch screen 600. Further, in some examples, predicted location 614a can be a weighted gradient radiating outward such that a point or area at the center of the gradient can be a most likely intended touch location, and the areas surrounding and further from the center can be progressively less likely intended touch locations. In some examples, if the size of the object being detected by touch screen 600 is less than a predetermined size, the touch sensing system may ignore predicted location 614a (or forgo determining it in the first instance), and instead use the centroid of the object as the identified touch location, because touches by a relatively small object (e.g., a stylus) can be considered to be accurate and intended.

In some examples, when tracking the trajectory of an incoming finger (e.g., finger 605a), the touch sensing system of the disclosure can track the movement of the centroid of the finger's capacitance profile detected on the touch screen; in some examples, the touch sensing system can track the movement of the point(s) in the finger's capacitance profile with the highest intensities; and in some examples, the touch sensing system can track the movement of the point(s) in the finger's capacitance profile that reflect the user's desired touch point on the user's finger (e.g., right at the tip of the finger, a predetermined distance further back from the tip of the finger, etc.), which can be preprogrammed into the touch sensing system in some examples, or can be determined by the touch sensing system over time based on the user's touch activity.

Similar to as described with respect to finger 605a, trajectory 607b and predicted location 614b for finger 605b can be tracked and determined. As illustrated, because finger 605b can be approaching touch screen 600 with a lower z-velocity but with the same x- and y-velocities as finger 605a, trajectory 607b of finger 605b can have a shallower angle than trajectory 607a of finger 605a, and predicted location 614b can be further away from location 612 than predicted location 614a.

FIGS. 6B and 6C illustrate exemplary capacitance profiles and intensities for fingers 605a and 605b, according to examples of the disclosure. Capacitance profiles 616a and 618a in FIG. 6B can correspond to the capacitance profiles of finger 605a when it was at locations 610a and 612 in FIG. 6A, respectively, and can represent successive sampling events on touch screen 600. For example, capacitance profile 616a could have been sampled during a first touch screen 600 sampling event, and capacitance profile 618a could have been sampled during a subsequent touch screen sampling event. When finger 605a was at location 610a, its capacitance profile 616a on touch screen 600 could have been larger (i.e., more spread out) than when finger 605a was closer to the touch screen at location 612 (represented by capacitance profile 618a). Also, the intensity of touch or proximity detected by touch screen 600 can have been less in capacitance profile 616a than in capacitance profile 618a (represented by the is in capacitance profile 616a and the 6s in capacitance profile 618a), because finger 605a can have been further from touch screen 600 at capacitance profile 616a than at capacitance profile 618a. The touch sensing system of the disclosure can utilize these changes in the size and/or intensity of the capacitance profiles of finger 605a over time to determine the z-velocity of finger 605a. It should be noted that in the examples of FIGS. 6B-6C, the range of touch intensities can range from 0 (no touch) to 10 (finger touching touch screen 600), though it is understood that other touch intensity ranges or actual capacitance values can instead be utilized in accordance with this disclosure. Further, although the touch intensities of capacitance profiles 616a and 618a are illustrated as being uniform (e.g., all 1s or all 6s), this is for simplicity of illustration only, and it is understood that the touch intensities of the capacitance profiles need not be uniform; for example, some portions of finger 605a may be closer to touch screen 600 than other portions, which can result in different touch intensities detected at the different touch node electrodes within the capacitance profiles.

Using capacitance profiles 616a and 618a, predicted location 614a can be determined as the location at which finger 605a is predicted to touchdown on touch screen 600, as previously described. In some examples, predicted location 614a can be a single touch node electrode, while in some examples, predicted location 614a can comprise multiple touch node electrodes. Further, in some examples, predicted location 614a need not correspond directly to a touch node electrode at all, but rather can represent a location on touch screen 600 that is independent of the actual hardware implementation of touch screen 600 (e.g., a coordinate or collection of coordinates to which the touch screen maps).

Predicted location 614a can be determined from capacitance profiles 616a and 618a in the manners previously described. For example, the rate of change of the sizes of capacitance profiles 616a and 618a and/or the rate of change of the intensities of the capacitance profiles can be used to determine the velocity of finger 605a towards touch screen 600 (i.e., in the z-direction). Further, the rate of change of the locations of capacitance profiles 616a and 618a (e.g., how far finger 605a has moved in the plane of touch screen 600 between capacitance profile 616a and 618a) can be used to determine the velocity of finger 605a in the plane of the touch screen (i.e., in the x-y plane). Using the two quantities determined above (z-velocity and x-y velocity), the touch sensing system can determine a predicted trajectory and/or touch location for finger 605a.

Analogously to above, capacitance profiles 616b and 618b in FIG. 6C can correspond to the capacitance profiles of finger 605b when it was at locations 610b and 612 in FIG. 6A, respectively, and can represent successive sampling events on touch screen 600. For example, capacitance profile 616b could have been sampled during a first touch screen 600 sampling event, and capacitance profile 618b could have been sampled during a subsequent touch screen sampling event. When finger 605b was at location 610b, its capacitance profile 616b on touch screen 600 could have been larger (i.e., more spread out) than when finger 605b was closer to the touch screen at location 612 (represented by capacitance profile 618b). Also, the intensity of touch or proximity detected by touch screen 600 can have been less in capacitance profile 616b than in capacitance profile 618b (represented by the 3s in capacitance profile 616b and the 6s in capacitance profile 618b), because finger 605b can have been further from touch screen 600 at capacitance profile 616b than at capacitance profile 618b. Note that the intensity of capacitance profile 616b can be higher than the intensity of capacitance profile 616a in FIG. 6B, because finger 605b at location 610b (corresponding to capacitance profile 616b) can have been closer to touch screen than finger 605a at location 610a (corresponding to capacitance profile 616a). For similar reasons, the size of capacitance profile 616b can be smaller than the size of capacitance profile 616a in FIG. 6B. As before, the touch sensing system of the disclosure can utilize the above changes in the size, intensity and or position of the capacitance profiles of finger 605b over time to determine a predicted trajectory and/or touch location for finger 605b.

Figure 7:
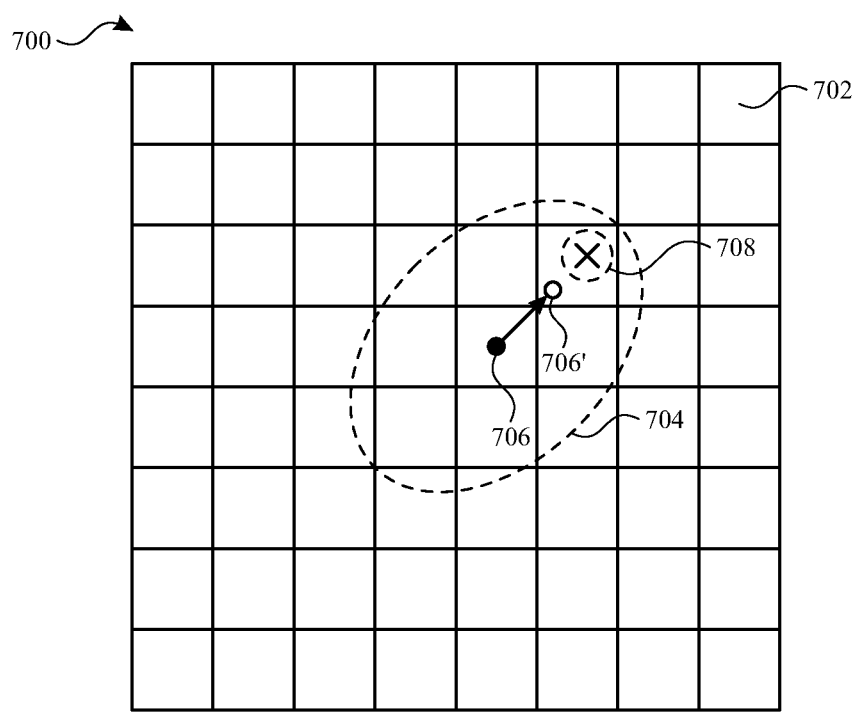
FIG. 7 illustrates an exemplary capacitance profile detected on a touch screen according to examples of the disclosure.

In some examples, the predicted touch location described above can be used as the identified touch location when the finger touches down on the touch screen (instead of, for example, the centroid of the finger when it touches down on the touch screen). In some examples, the predicted touch location can instead be used to shift, rather than replace, the centroid of the capacitance profile of the finger when it touches down on the touch screen to determine the identified touch location of the finger. FIG. 7 illustrates an exemplary capacitance profile 704 detected on touch screen 700 according to examples of the disclosure. Capacitance profile 704 can correspond to a finger or object touching or in proximity to touch screen 700. Capacitance profile 704 can have centroid 706 and can be associated with predicted touch location 708, which can be determined as described above. In some examples, the identified touch location of capacitance profile 704 can be determined to be an average (e.g., a weighted average) of centroid 706 and predicted touch location 708, represented by identified touch location 706'. In other examples, the centroid 706 can be shifted a fractional amount towards the predicted touch location 708 (e.g., moved towards the predicted touch location by 75% of the distance between the centroid and the predicted touch location), where the amount of the shift can depend on other factors such as accelerometer data (e.g., indicative of the strength of a jarring motion that might cause an earlier than expected touchdown). In still other examples, the centroid can shift in other directions, by other amounts, depending on a variety of factors and collected data. In this way, the identified touch location can be determined as a modified centroid of the capacitance profile instead of simply the predicted touch location.

Figure 8A:
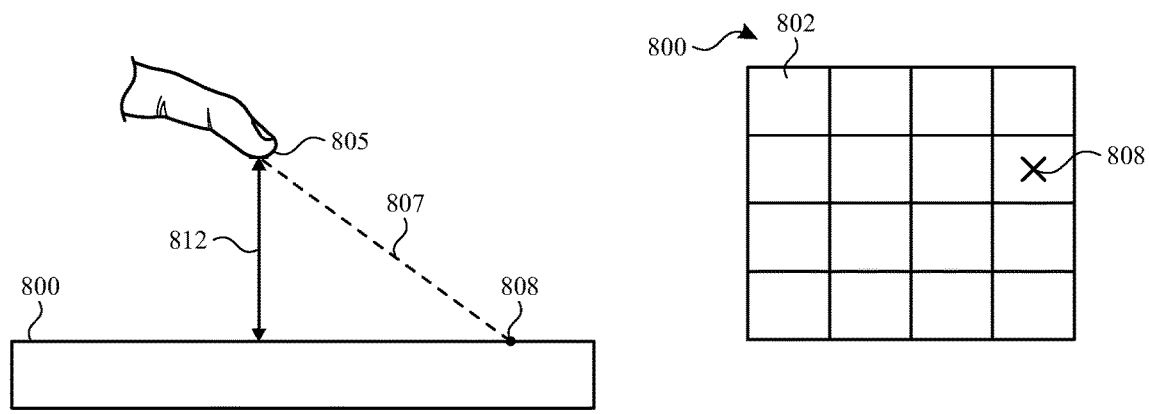
FIGS. 8A-8C illustrate a scenario in which the predicted touch location of a finger approaching a touch screen can change over time according to examples of the disclosure.
Figure 8B:
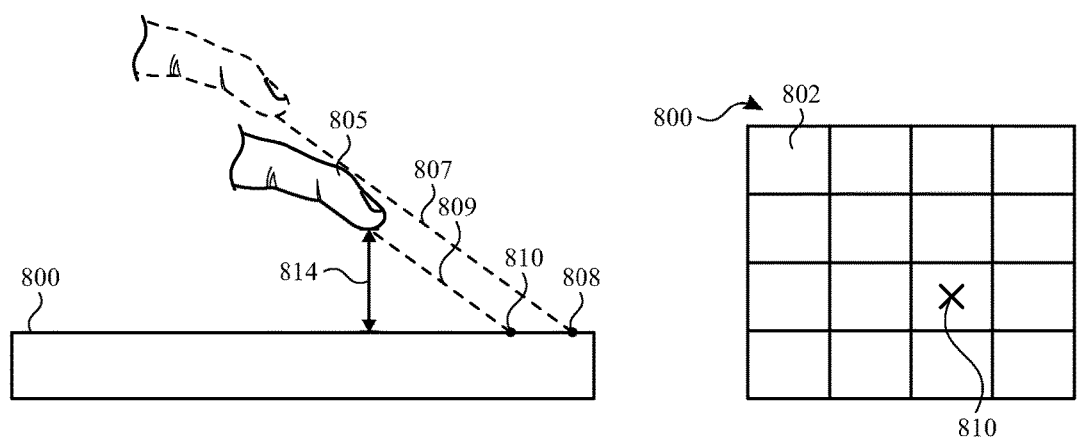
Figure 8C:
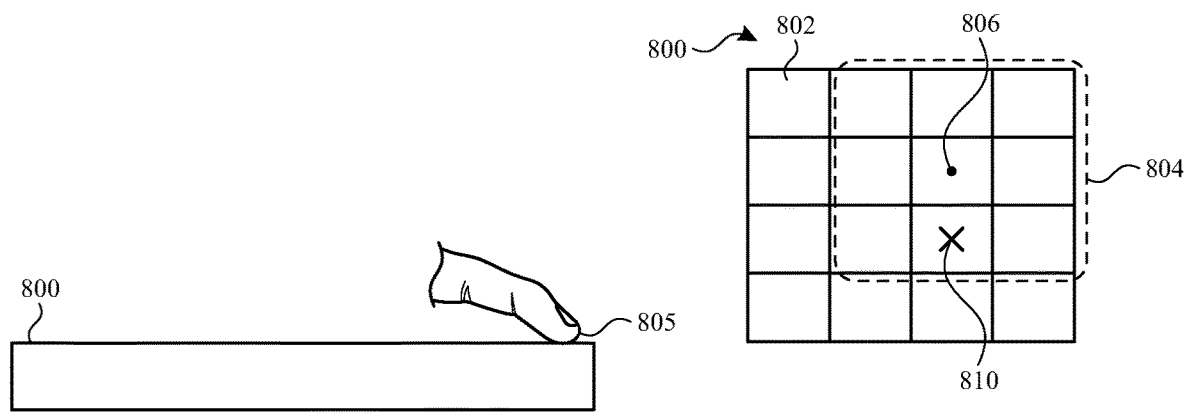

In some examples, the predicted touch location of a finger approaching the touch screen can change over time, because the finger's movement can change over time (e.g., change direction, start moving more quickly or slowly, etc.). FIGS. 8A-8C illustrate such a scenario in which the predicted touch location of a finger approaching touch screen 800 can change over time according to examples of the disclosure. FIG. 8A illustrates finger 805 located a distance 812 from the surface of touch screen 800. The touch sensing system has predicted trajectory 807 and touch location 808 based on finger 805's trajectory towards touch screen 800 up to this point in time.

FIG. 8B illustrates finger 805 located a distance 814, less than distance 812, from the surface of touch screen 800. Finger 805 has moved closer to touch screen 800 than in FIG. 8A. The trajectory of finger 805 has also changed in some manner with respect to FIG. 8A (e.g., the finger has started moving towards touch screen 800 at a faster speed), and therefore the touch sensing system has predicted a new trajectory 809 and touch location 810 based on the finger's trajectory towards the touch screen up to this point in time. For example, as stated above, finger 805 may have started moving more quickly towards touch screen 800 than in FIG. 8A, and thus predicted touch location 810 can be closer to finger 805 than is previously-predicted touch location 808 (e.g., the touch sensing system has predicted that finger 805 will touch down on touch screen 800 sooner than previously predicted in FIG. 8A).

FIG. 8C illustrates finger 805 having touched down on touch screen 800. Finger 805 can be associated with capacitance profile 804 upon touch down on touch screen 800. Capacitance profile 804 can have centroid 806. Further, finger 805 can be associated with predicted touch location 810, which can be at a different location than centroid 806. In the example illustrated, predicted touch location 810 can have remained substantially constant between FIG. 8B and FIG. 8C, because, for example, finger 805 can have substantially followed trajectory 809 to the surface of touch screen 800 beginning at least at FIG. 8B. FIGS. 8A-8C are provided by way of example only to illustrate that the touch sensing system of the disclosure can modify, over time, its predicted trajectory and/or touch location for a finger or object approaching the touch screen, and the exact manner of such modification is not limited to that illustrated in FIGS. 8A-8C.

Figure 9A:
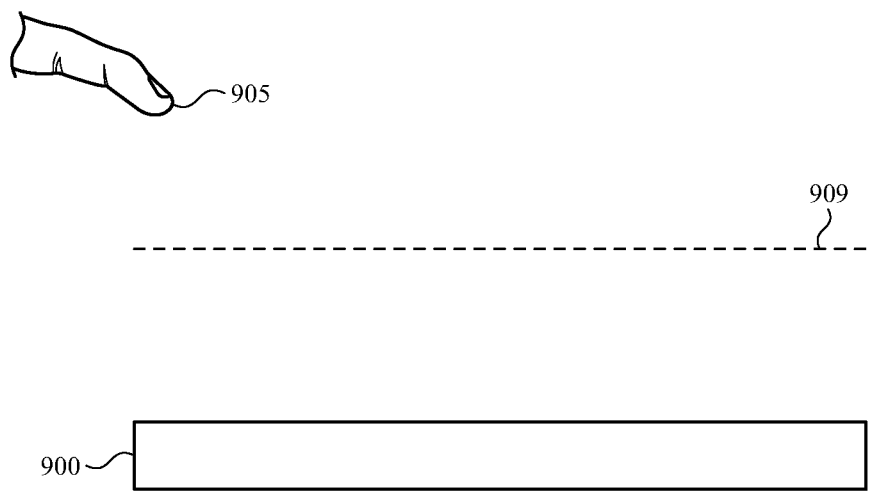
FIGS. 9A-9C illustrate exemplary trajectory tracking and prediction utilizing a threshold distance according to examples of the disclosure.
Figure 9B:
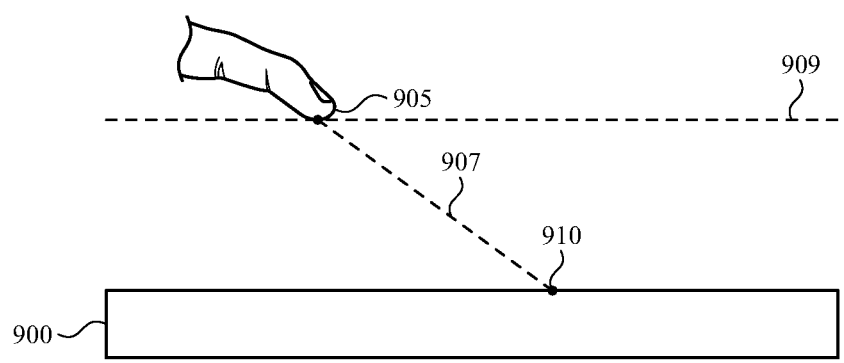
Figure 9C:
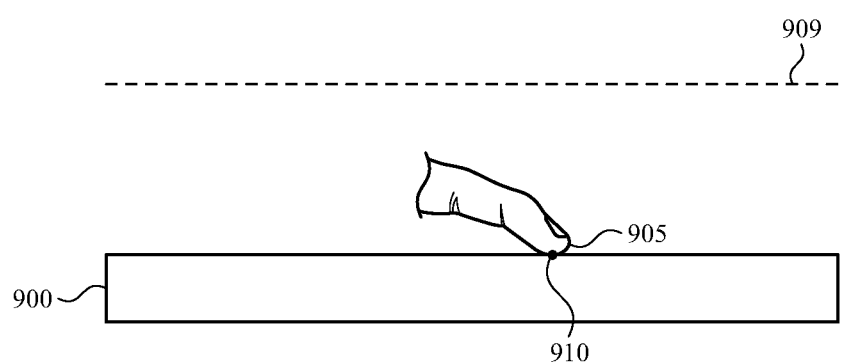

In some examples, the touch sensing system of the disclosure can track and predict the trajectory of an incoming finger or object at any distance from the touch screen. However, in some examples, the touch sensing system may not start tracking and predicting the trajectory of an incoming finger or object until the finger or object is a threshold distance from the touch screen; in some examples, this can be to reduce touch screen power consumption. FIGS. 9A-9C illustrate exemplary trajectory tracking and prediction utilizing threshold distance 909 according to examples of the disclosure. FIG. 9A illustrates finger 905 further than threshold distance 909 from touch screen 900. The touch sensing system of the disclosure can forgo predicting the trajectory of finger 905 to conserve power when the finger is greater than threshold distance 909 from touch screen 900. It is understood that while threshold distance 909 can be thought of as a distance, it can manifest itself in the intensity of the capacitance profile corresponding to finger 905 detected by touch screen 900. In other words, high capacitance intensities (e.g., greater than an intensity threshold) can correspond to finger 905 being relatively near or in contact with touch screen 900, while low capacitance intensities (e.g., less than the intensity threshold) can correspond to the finger being relatively far from the touch screen—the finger can be determined to have crossed threshold distance 909 when its capacitance profile intensity reaches a corresponding intensity threshold.

FIG. 9B illustrates finger 905 having crossed threshold distance 909 from touch screen 900. In response, the touch sensing system can start tracking and predicting trajectory 907 and predicted touch location 910, as previously discussed. In some examples, the touch sensing system can start tracking finger 905 once the finger crosses threshold distance 909, but may not start predicting trajectory 907 immediately, because two or more detected positions of finger 905 may be required to determine trajectory 907—in such examples, the touch sensing system can start predicting trajectory 907 once two or more positions of finger 905 have been detected after finger 905 crosses threshold distance 909. FIG. 9C illustrates finger 905 having touched down on touch screen 900 at predicted touch location 910.

Figure 10A:
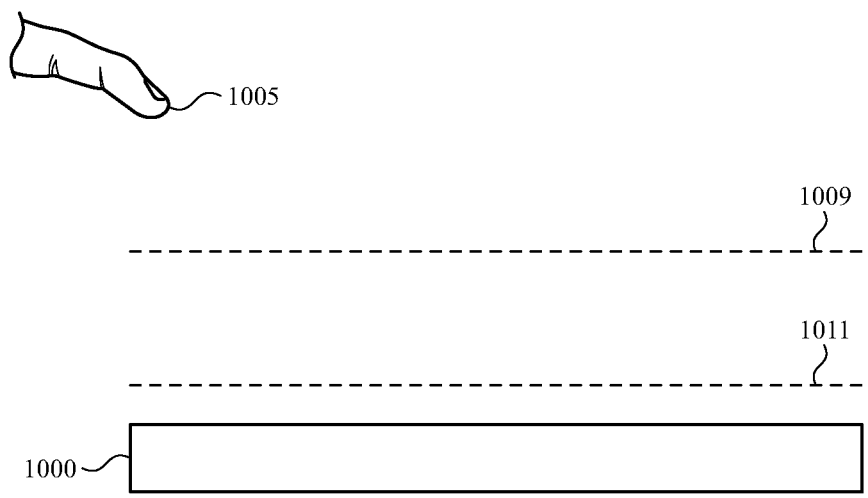
FIGS. 10A-10C illustrate exemplary trajectory tracking and prediction utilizing multiple threshold distances according to examples of the disclosure.
Figure 10B:
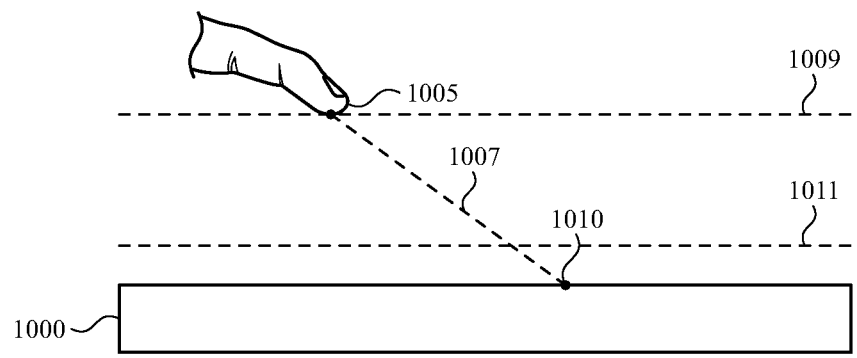
Figure 10C:
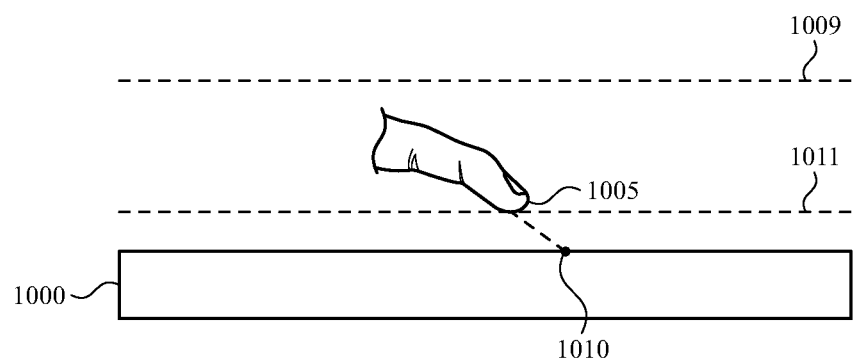

In some examples, multiple distance thresholds can be utilized in the trajectory tracking and prediction disclosed above, as illustrated in FIGS. 10A-10C. FIG. 10A, similar to FIG. 9A, illustrates finger 1005 further than threshold distance 1009 from touch screen 1000. The touch sensing system of the disclosure can forgo predicting the trajectory of finger 1005 to conserve power when the finger is greater than threshold distance 1009 from touch screen 1000.

FIG. 10B illustrates finger 1005 having crossed threshold distance 1009 from touch screen 1000. The touch sensing system can start tracking and predicting trajectory 1007 and predicted touch location 1010, as previously discussed.

In contrast to the examples of FIGS. 9A-9C, in FIG. 10C, a second threshold distance 1011 from touch screen 1000, closer than threshold distance 1009 from the touch screen, can correspond to a predicted touch location lock threshold. When finger 1005 reaches threshold distance 1011, predicted touch location 1010 can be registered as the identified touch location on touch screen 1000. In some examples, predicted touch location 1010 can be registered and identified as a touch input as soon as finger 1005 crosses threshold distance 1011. In some examples, predicted touch location 1010 can be stored as a future touch input location when finger 1005 crosses threshold distance 1011, but actual use or registering of predicted touch location 1010 as a touch input can be delayed until finger 1005 actually touches touch screen 1000 (or crosses a third threshold distance from touch screen 1000, closer to the touch screen than threshold distance 1011). In some examples, finger 1005 can be determined to have touched touch screen 1000 because the intensity of its capacitance profile is greater than an intensity threshold, and/or because an amount of force detected on the touch screen is greater than a force threshold (in a scenario in which the touch screen has force sensing capabilities).

In some examples, the surface of touch screen 1000 and the location of the display in the touch screen may not coincide (i.e., the display of the touch screen may be behind one or more layers of the touch screen, such as a cover surface of the touch screen). In such circumstances, a user may be prevented by a cover surface of the touch screen or the like from directly or nearly directly touching an element displayed on touch screen 1000, which can cause the user's actual touch location to fall short of the user's intended touch location. This issue can be addressed by using the trajectory tracking and prediction framework of FIGS. 10A-10C, where threshold distance 1011 can represent the surface of, for example, the cover surface of touch screen 1000, and the surface of the touch screen in the figures can represent the location of the display in the touch screen. When finger 1005 reaches threshold distance 1011, and cannot proceed further due to touching the surface of the cover surface, predicted touch location 1010, which can be extrapolated to the surface of the display, can be used as the identified touch location.

Figure 11:
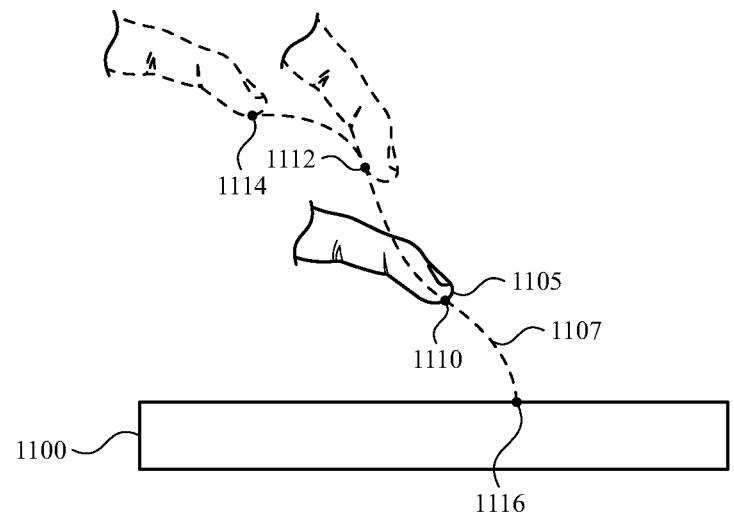
FIG. 11 illustrates an exemplary non-linear trajectory of a finger approaching a touch screen according to examples of the disclosure.

As previously described, the tracked and predicted trajectory of a finger or object approaching the touch screen of the disclosure need not be linear, but could be any type of trajectory, including non-linear trajectories. FIG. 11 illustrates an exemplary non-linear trajectory 1107 of finger 1105 approaching touch screen 1100 according to examples of the disclosure. Finger 1105 can currently be at location 1110. Previously, finger 1005 could have been at locations 1112 and 1114, as illustrated. From locations 1114 and 1112 to location 1110, finger 1105 can have followed a non-linear trajectory, as illustrated. Based on that non-linear trajectory, the touch sensing system of the disclosure can predict non-linear trajectory 1107 and predicted touch location 1116. In some examples, the touch sensing system can predict non-linear trajectory 1107 using one or more curve-fitting techniques (e.g. "Newton-Raphson").

Figure 12:
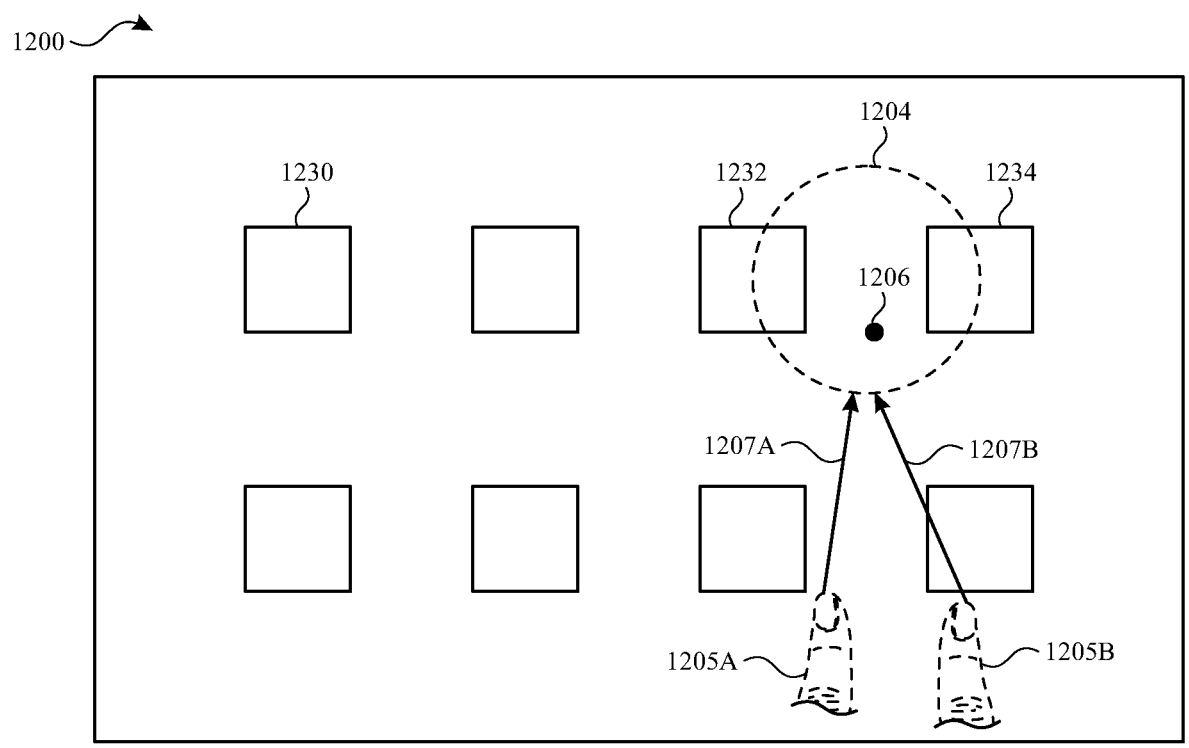
FIG. 12 illustrates an exemplary touch screen displaying user interface elements according to examples of the disclosure.

In some examples, the trajectory via which a finger or object has approached the touch screen may be used to determine an identified touch location on the touch screen without determining a predicted touch location to do so. FIG. 12 illustrates an exemplary touch screen 1200 displaying user interface elements 1230 according to examples of the disclosure. Touch screen 1200 can display user interface elements 1230, including user interface elements 1232 and 1234. In some examples, user interface elements 1230, 1232 and 1234 can be individual keys on a keyboard displayed on touch screen 1200. A finger may have touched touch screen 1200 in between user interface elements 1232 and 1234 on the touch screen, as represented by capacitance profile 1204 having centroid 1206 in between user interface elements 1232 and 1234. Because centroid 1206 of capacitance profile 1204 can be in between user interface elements 1232 and 1234, whether user interface element 1232 or user interface element 1234 should be selected by the finger can be unclear.

However, the trajectory with which the finger approached touch screen 1200 can be used to identify the intended user interface element to be selected. For example, if capacitance profile 1204 resulted from touchdown of finger 1205a, which approached touch screen 1200 via trajectory 1207a, the touch sensing system can determine that user interface element 1234 should be selected, because trajectory 1207a can be directed towards user interface element 1234. On the other hand, if capacitance profile 1204 resulted from touchdown of finger 1205b, which approached touch screen 1200 via trajectory 1207b, the touch sensing system can determine that user interface element 1232 should be selected, because trajectory 1207b can be directed towards user interface element 1232. In this way, the trajectory of an incoming finger or object can be used, sometimes without determining an intended touch location, in determining a user interface element to be selected on the touch screen.

In some examples, in addition or alternatively to utilizing the relationship between the direction of the finger's trajectory and the location of a particular user interface element on the touch screen, the touch sensing system of the disclosure can simply utilize the finger's trajectory in determining which user interface element on the touch screen should be selected. For example, referring again to FIG. 12, user interface element 1232 can be a "U" key in an on-screen keyboard, and user interface element 1234 can be an "I" key in the on-screen keyboard. The touch sensing system of the disclosure can be configured to expect that it is more likely for a user, typing on the keyboard, to select the "U" key 1232 with their index finger, and to select the "I" key 1234 with their middle finger. This expectation can be pre-programmed in the touch sensing system, and/or can be developed over time based on user typing behavior on the on-screen keyboard.

In response to detecting capacitance profile 1204, which can be unclear as to which of the "U" key 1232 or the "I" key 1234 should be selected, the touch sensing system of the disclosure can analyze the trajectory with which the finger approached touch screen 1200. A user's index finger can substantially follow a first type of trajectory when approaching touch screen 1200, while a user's middle finger can substantially follow a second type of trajectory when approaching the touch screen; in other words, index fingers and middle fingers can follow different trajectories when approaching the touch screen. This can similarly apply to other fingers as well. Based on this information, the touch sensing system of the disclosure can determine which of a user's fingers resulted in capacitance profile 1204 (e.g., whether it was an index finger or a middle finger). It is understood that in some examples, the above-described trajectories may not be the only factors used in identifying which of a user's fingers resulted in capacitance profile 1204; other factors can include the velocity of the finger and the shape of capacitance profile 1204, for example. Based on the above finger identification, the touch sensing system can cause selection of the appropriate user interface element. For example, if the finger was identified as being an index finger, the touch sensing system can cause selection of the "U" key 1232, and if the finger was identified as being a middle finger, the touch sensing system can cause selection of the "I" key 1234. Such finger trajectory-user interface element correlations can similarly be utilized in other contexts as well.

Figure 13A:
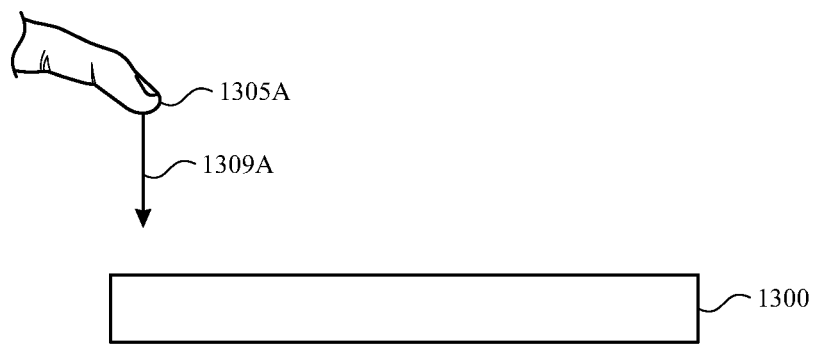
FIGS. 13A-13B illustrate exemplary touch processing based on the velocity with which a finger is approaching a touch screen according to examples of the disclosure.
Figure 13B:

In some examples, the velocity of the finger or object as it approaches the touch screen along a trajectory can be used in processing touch inputs on the touch screen of the disclosure. FIGS. 13A-13B illustrate exemplary touch processing based on the velocity with which a finger is approaching touch screen 1300 according to examples of the disclosure. In FIG. 13A, finger 1305a can be approaching touch screen 1300 with a relatively high velocity (e.g., a relatively high z-velocity as represented by vector 1309a), while in FIG. 13B, finger 1305b can be approaching the touch screen with a relatively low velocity (e.g., a relatively low z-velocity as represented by vector 1309b). A relatively high velocity can be a velocity greater than a velocity threshold, while a relatively low velocity can be a velocity below a velocity threshold.

Because the velocity of finger 1305a can be relatively high, a touch resulting from finger 1305a touching touch screen 1300 can be registered and analyzed as a touch input, because such a touch can be assumed to be intentional. For example, if a user is typing on an on-screen keyboard on touch screen 1300, high finger velocity can be associated with deliberate typing action by the user. On the other hand, low finger velocity can be associated with unintentional contact with touch screen 1300 (i.e., not deliberate typing action by the user), such as due to the user resting fingers on the touch screen. Therefore, because the velocity of finger 1305b can be relatively low, a touch resulting from finger 1305b touching touch screen 1300 can be ignored and not registered or analyzed as a touch input, because such a touch can be assumed to be unintentional. This can allow users to rest their hands or fingers on touch screen 1300 while typing without registering accidental key inputs due to such resting.

The specific velocity thresholds utilized can be preprogrammed, and/or can be based on a user's own typing behaviors that the touch sensing system can determine over time. Further, different velocity thresholds can be utilized in different contexts (e.g., different velocity thresholds can be utilized depending on whether a keyboard is on screen or another application is on screen). Additionally, in some contexts, a high finger velocity can be indicative of an unintentional touch while a low finger velocity can be indicative of an intentional touch, as appropriate.

Figure 14:
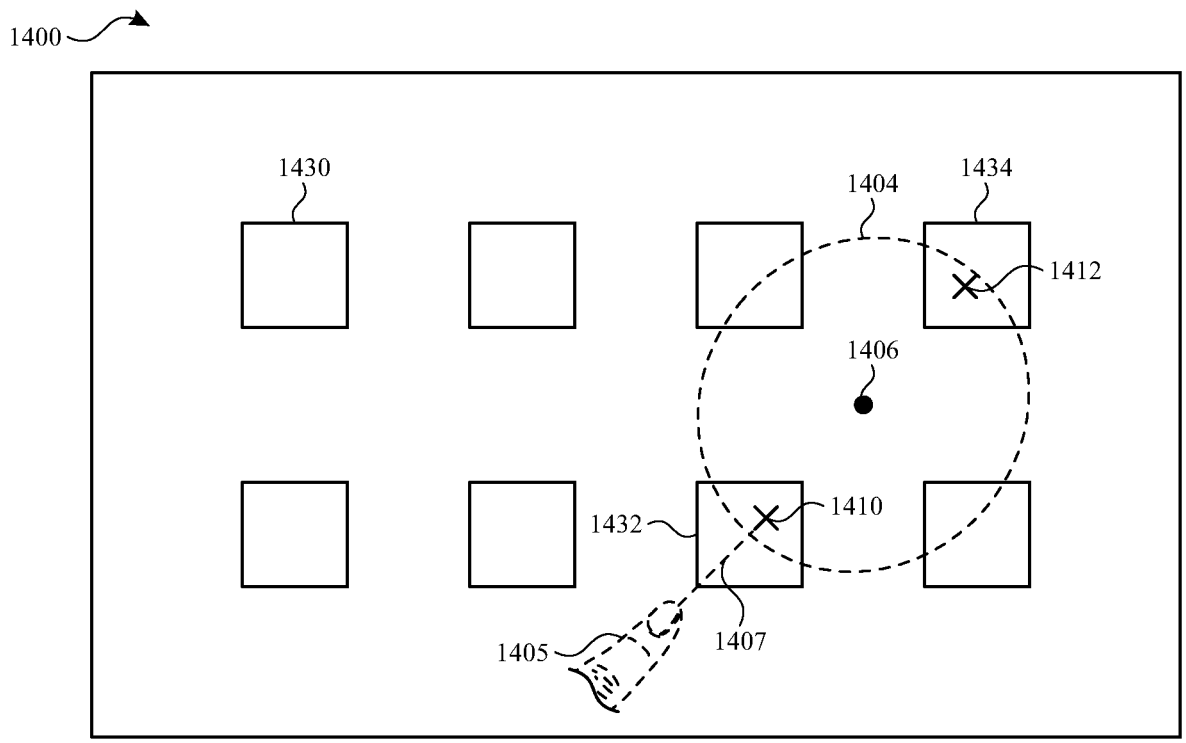
FIG. 14 illustrates an exemplary touch screen displaying user interface elements and detecting a capacitance profile according to examples of the disclosure.

In some examples, the predicted touch location can be used to select a user interface element on the touch screen of the disclosure. FIG. 14 illustrates an exemplary touch screen 1400 displaying user interface elements 1430 and detecting capacitance profile 1404 according to examples of the disclosure. Touch screen 1400 can display user interface elements 1430, 1432 and 1434, which can correspond to keys on an on-screen keyboard, though is it understood that the user interface elements could alternatively correspond to any user interface element such as icons on a home screen of a mobile device. Touch screen 1404 can detect capacitance profile 1404 from finger 1405 touching the touch screen. Capacitance profile 1404 can have centroid 1406, which can be positioned in between user interface elements, including user interface elements 1432 and 1434. Therefore, utilizing centroid 1406 to determine which user interface element should be selected can result in an inaccurate selection.

The touch sensing system of the disclosure can utilize the trajectory tracking and prediction as discussed previously to determine a predicted touch location of finger 1405 before it touches touch screen 1400 to aid in selecting the correct user interface element. For example, finger 1405 can have followed trajectory 1407 to the surface of touch screen 1400 before touching the touch screen, and the touch sensing system can have determined predicted touch location 1410 based on that trajectory. In such an example, when finger 1405 touches touch screen 1400 at capacitance profile 1404, the touch sensing system can select user interface element 1432, because predicted touch location 1410 can coincide with user interface element 1432. As another example, if the touch sensing system has determined predicted touch location 1412 based on trajectory 1407, when finger 1405 touches touch screen 1400 at capacitance profile 1404, the touch sensing system can select user interface element 1434, because predicted touch location 1412 can coincide with user interface element 1434. As such, the relationship between the predicted touch location and user interface elements can be used to determine which user interface element should be selected in response to a touch detected on the touch screen.

Figure 15:
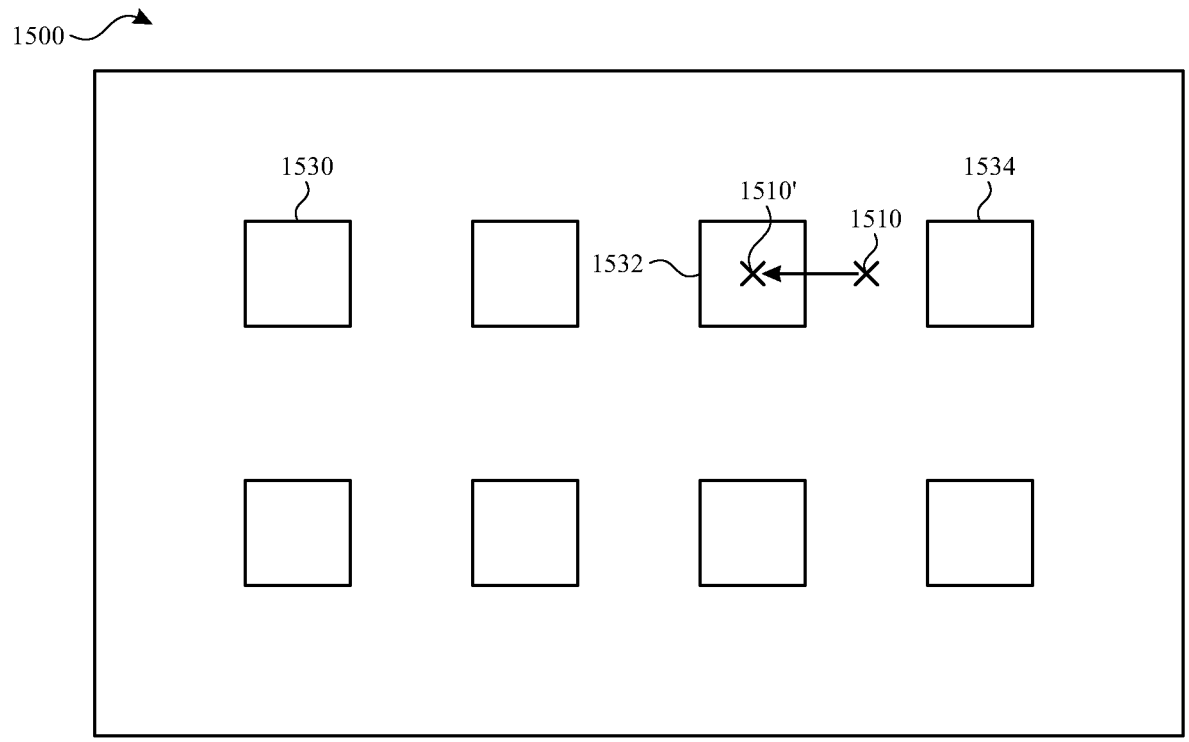
FIG. 15 illustrates an exemplary touch screen in which a predicted touch location is determined based on at least user interface elements displayed by the touch screen according to examples of the disclosure.

In some examples, determination of the predicted touch location on the touch screen can be based on not only the trajectory with which a finger or object is approaching the touch screen, but also what is displayed on the touch screen. FIG. 15 illustrates an exemplary touch screen 1500 in which predicted touch location 1510 is determined based on at least user interface elements 1530 displayed by the touch screen according to examples of the disclosure. Touch screen 1500 can display user interface elements 1530, including user interface elements 1532 and 1534. Predicted touch location 1510 can be determined by the touch sensing system of the disclosure, as previously described. However, predicted touch location 1510 can be adjusted to become predicted touch location 1510' based on one or more characteristics of user interface elements 1530, 1532 and/or 1534. For example, if user interface element 1532 is a user interface element that is most likely to be selected on the touch screen, predicted touch location 1510 that is in between user interface elements 1532 and 1534 can be modified to move towards user interface element 1532, as represented by predicted touch location 1510', based on the theory that a user is more likely to intend to touch a user interface element that is more likely to be selected. For example, user interface elements 1530, 1532 and 1534 can be icons on a home screen of a mobile device, and user interface element 1532 can be an icon that a user selects most frequently. Because icon 1532 can be most likely to be selected by the user, the touch sensing system can weight predicted touch location 1510 towards icon 1532 (as updated predicted touch location 1510'). As another example, icons or user interface elements towards the center of touch screen 1500 can be considered to be more likely to be selected than icons or user interface elements towards the edges of the touch screen (and thus predicted touch location 1510 can be weighted towards icons in the center of the touch screen). Similarly, larger icons or user interface elements can be considered to be more likely to be selected than icons or user interface elements that are smaller (and thus predicted touch location 1510 can be weighted towards larger icons). Finally, icons or user interface elements that are within a predetermined distance of the finger's predicted trajectory or predicted touch location 1510, or within a predetermined degree range of the finger's predicted trajectory's orientation, can be considered to be more likely to be selected than other icons or user interface elements (and thus the predicted touch location can be weighted towards such icons).

As another example, user interface elements 1530, 1532 and 1534 can be keys on an on-screen keyboard, and user interface element 1532 can be a key that is most likely to be selected next (or, more likely to be selected than key 1534 to the right of predicted touch location 1510). Key 1532 can be determined to be most likely to be selected next based on, for example, the characters already entered by the user via the keyboard, and key 1532 can correspond to a character that is most likely to follow the already-entered characters (e.g., the characters "ca" can have been already-entered, and key 1532 can correspond to the key "t" to spell "cat", while key 1534 can correspond to the key "y", which can be less likely to be entered). In such a scenario, the touch sensing system can weight predicted touch location 1510 towards key 1532 (as updated predicted touch location 1510').

For the above examples, and other scenarios in which the likelihood of selection of different user interface elements can be different, updated predicted touch location 1510' can be used in any one or more of the manners described previously to analyze touch activity on touch screen 1500.

Figure 16:
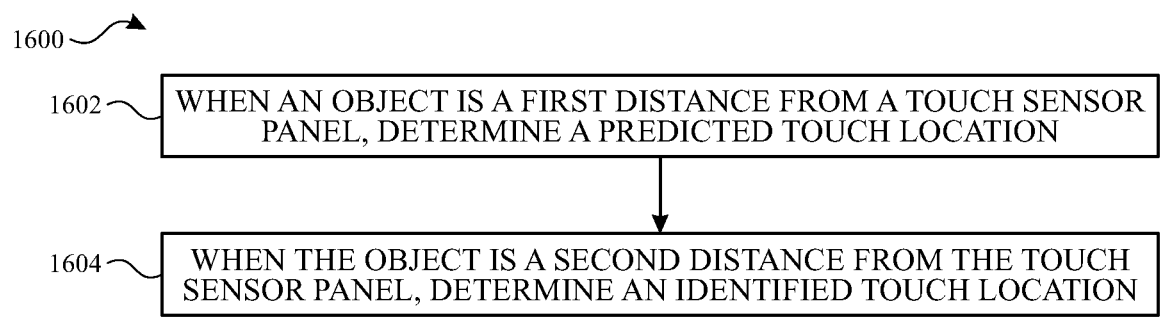
FIG. 16 illustrates an exemplary flowchart for determining a touch location of an object at a touch sensor panel according to examples of the disclosure.

FIG. 16 illustrates exemplary flowchart 1600 for determining a touch location of an object at a touch sensor panel according to examples of the disclosure. At step 1602, when the object is a first distance from the touch sensor panel, a predicted touch location associated with the object on the touch sensor panel can be determined based on at least a trajectory of the object towards the touch sensor panel. This determination can be in any of the manners described above with reference to FIGS. 5-15.

At step 1604, when the object is a second distance from the touch sensor panel, less than the first distance, an identified touch location associated with the object on the touch sensor panel can be determined based on at least the predicted touch location. This determination can be in any of the manners described above with reference to FIGS. 5-15.

Thus, the examples of the disclosure provide various ways for tracking and predicting the trajectories and/or touch locations of objects approaching a touch screen, resulting in increased touch detection accuracy on the touch screen.

Therefore, according to the above, some examples of the disclosure are directed to a touch controller comprising: sense circuitry configured to sense an object at a touch sensor panel; and a touch processor capable of: when the object is a first distance from the touch sensor panel, determining a predicted touch location associated with the object on the touch sensor panel based on at least a trajectory of the object towards the touch sensor panel; and when the object is a second distance from the touch sensor panel, less than the first distance, determining an identified touch location associated with the object on the touch sensor panel based on at least the predicted touch location. Additionally or alternatively to one or more of the examples disclosed above, in some examples, the object is the second distance from the touch sensor panel when the object is touching a surface of the touch sensor panel. Additionally or alternatively to one or more of the examples disclosed above, in some examples, the touch processor is further capable of determining a centroid of the object, and the predicted touch location of the object is different from the centroid of the object. Additionally or alternatively to one or more of the examples disclosed above, in some examples, determining the identified touch location associated with the object comprises designating the predicted touch location as the identified touch location. Additionally or alternatively to one or more of the examples disclosed above, in some examples, determining the identified touch location associated with the object comprises determining the identified touch location based on the predicted touch location and the centroid of the object. Additionally or alternatively to one or more of the examples disclosed above, in some examples, the touch processor is further capable of: when the object is a third distance from the touch sensor panel, between the first distance and the second distance, updating the predicted touch location based on at least an updated trajectory of the object towards the touch sensor panel. Additionally or alternatively to one or more of the examples disclosed above, in some examples, the touch processor is further capable of determining that the object is a first threshold distance from the touch sensor panel, wherein the first distance is less than or equal to the first threshold distance, and determining the predicted touch location associated with the object on the touch sensor panel is in response to determining that the object is the first threshold distance from the touch sensor panel. Additionally or alternatively to one or more of the examples disclosed above, in some examples, the touch processor is further capable of determining that the object is a second threshold distance, less than the first threshold distance, from the touch sensor panel, wherein the second distance is less than or equal to the second threshold distance, and determining the identified touch location associated with the object on the touch sensor panel is in response to determining that the object is the second threshold distance from the touch sensor panel. Additionally or alternatively to one or more of the examples disclosed above, in some examples, the touch processor is further capable of: after determining the identified touch location associated with the object, determining that the object is touching a surface of the touch sensor panel; and in response to determining that the object is touching the surface of the touch sensor panel, identifying an input associated with the object based on the identified touch location. Additionally or alternatively to one or more of the examples disclosed above, in some examples, the touch controller is coupled to a display, and determining the identified touch location comprises: in accordance with a determination that the trajectory of the object towards the touch sensor panel is a first trajectory, selecting a first user interface element displayed by the display in response to determining that the object is the second distance from the touch sensor panel; and in accordance with a determination that the trajectory of the object towards the touch sensor panel is a second trajectory, different from the first trajectory, selecting a second user interface element, different from the first user interface element, displayed by the display in response to determining that the object is the second distance from the touch sensor panel. Additionally or alternatively to one or more of the examples disclosed above, in some examples, determining the identified touch location further comprises: in accordance with the determination that the trajectory of the object towards the touch sensor panel is the first trajectory, identifying the object as a first finger based on at least the trajectory of the object towards the touch sensor panel; and in accordance with the determination that the trajectory of the object towards the touch sensor panel is the second trajectory, identifying the object as a second finger, different from the first finger, based on at least the trajectory of the object towards the touch sensor panel. Additionally or alternatively to one or more of the examples disclosed above, in some examples, the touch controller is coupled to a display, and determining the identified touch location further comprises determining the identified touch location based on at least one or more user interface elements displayed by the display. Additionally or alternatively to one or more of the examples disclosed above, in some examples, determining the identified touch location further comprises adjusting the predicted touch location based on respective likelihoods of selection of the one or more user interface elements.

Some examples of the disclosure are directed to a non-transitory computer readable storage medium storing one or more programs, the one or more programs comprising instructions, which when executed by a processor cause the processor to perform a method comprising: sensing an object at a touch sensor panel; when the object is a first distance from the touch sensor panel, determining a predicted touch location associated with the object on the touch sensor panel based on at least a trajectory of the object towards the touch sensor panel; and when the object is a second distance from the touch sensor panel, less than the first distance, determining an identified touch location associated with the object on the touch sensor panel based on at least the predicted touch location. Additionally or alternatively to one or more of the examples disclosed above, in some examples, the method further comprises: determining a centroid of the object, wherein the predicted touch location of the object is different from the centroid of the object. Additionally or alternatively to one or more of the examples disclosed above, in some examples, determining the identified touch location associated with the object comprises designating the predicted touch location as the identified touch location. Additionally or alternatively to one or more of the examples disclosed above, in some examples, determining the identified touch location associated with the object comprises determining the identified touch location based on the predicted touch location and the centroid of the object. Additionally or alternatively to one or more of the examples disclosed above, in some examples, the method further comprises: when the object is a third distance from the touch sensor panel, between the first distance and the second distance, updating the predicted touch location based on at least an updated trajectory of the object towards the touch sensor panel. Additionally or alternatively to one or more of the examples disclosed above, in some examples, the method further comprises: determining that the object is a first threshold distance from the touch sensor panel, wherein the first distance is less than or equal to the first threshold distance, wherein determining the predicted touch location associated with the object on the touch sensor panel is in response to determining that the object is the first threshold distance from the touch sensor panel. Additionally or alternatively to one or more of the examples disclosed above, in some examples, the method further comprises: determining that the object is a second threshold distance, less than the first threshold distance, from the touch sensor panel, wherein the second distance is less than or equal to the second threshold distance, wherein determining the identified touch location associated with the object on the touch sensor panel is in response to determining that the object is the second threshold distance from the touch sensor panel. Additionally or alternatively to one or more of the examples disclosed above, in some examples, determining the identified touch location comprises: in accordance with a determination that the trajectory of the object towards the touch sensor panel is a first trajectory, selecting a first user interface element displayed by a display in response to determining that the object is the second distance from the touch sensor panel; and in accordance with a determination that the trajectory of the object towards the touch sensor panel is a second trajectory, different from the first trajectory, selecting a second user interface element, different from the first user interface element, displayed by the display in response to determining that the object is the second distance from the touch sensor panel. Additionally or alternatively to one or more of the examples disclosed above, in some examples, determining the identified touch location further comprises: in accordance with the determination that the trajectory of the object towards the touch sensor panel is the first trajectory, identifying the object as a first finger based on at least the trajectory of the object towards the touch sensor panel; and in accordance with the determination that the trajectory of the object towards the touch sensor panel is the second trajectory, identifying the object as a second finger, different from the first finger, based on at least the trajectory of the object towards the touch sensor panel. Additionally or alternatively to one or more of the examples disclosed above, in some examples, determining the identified touch location further comprises determining the identified touch location based on at least one or more user interface elements displayed by the display. Additionally or alternatively to one or more of the examples disclosed above, in some examples, determining the identified touch location further comprises adjusting the predicted touch location based on respective likelihoods of selection of the one or more user interface elements.

Some examples of the disclosure are directed to a method comprising: sensing an object at a touch sensor panel; when the object is a first distance from the touch sensor panel, determining a predicted touch location associated with the object on the touch sensor panel based on at least a trajectory of the object towards the touch sensor panel; and when the object is a second distance from the touch sensor panel, less than the first distance, determining an identified touch location associated with the object on the touch sensor panel based on at least the predicted touch location.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch controller comprising:
sense circuitry configured to sense an object at a touch sensor panel; and
a touch processor capable of:
when the object is a first distance from the touch sensor panel, determining a predicted touch location associated with the object on the touch sensor panel based on at least a trajectory of the object towards the touch sensor panel; and
when the object is a second distance from the touch sensor panel, less than the first distance, determining an identified touch location associated with the object on the touch sensor panel based on at least the predicted touch location, wherein the identified touch location is different than the predicted touch location and a centroid of the object detected when the object is at the second distance from the touch sensor panel.

2. The touch controller of claim 1, wherein the object is the second distance from the touch sensor panel when the object is touching a surface of the touch sensor panel.

3. The touch controller of claim 1, wherein the predicted touch location of the object is different from the centroid of the object.

4. The touch controller of claim 1, wherein the touch processor is further capable of:
when the object is a third distance from the touch sensor panel, between the first distance and the second distance, updating the predicted touch location based on at least an updated trajectory of the object towards the touch sensor panel.

5. The touch controller of claim 1, wherein:
the touch processor is further capable of determining that the object is a first threshold distance from the touch sensor panel, wherein the first distance is less than or equal to the first threshold distance, and
determining the predicted touch location associated with the object on the touch sensor panel is in response to determining that the object is the first threshold distance from the touch sensor panel.

6. The touch controller of claim 5, wherein:
the touch processor is further capable of determining that the object is a second threshold distance, less than the first threshold distance, from the touch sensor panel, wherein the second distance is less than or equal to the second threshold distance, and
determining the identified touch location associated with the object on the touch sensor panel is in response to determining that the object is the second threshold distance from the touch sensor panel.

7. The touch controller of claim 6, wherein the touch processor is further capable of:
after determining the identified touch location associated with the object, determining that the object is touching a surface of the touch sensor panel; and
in response to determining that the object is touching the surface of the touch sensor panel, identifying an input associated with the object based on the identified touch location.

8. The touch controller of claim 1, wherein:
the touch controller is coupled to a display, and
determining the identified touch location comprises:

in accordance with a determination that the trajectory of the object towards the touch sensor panel is a first trajectory, selecting a first user interface element displayed by the display in response to determining that the object is the second distance from the touch sensor panel; and in accordance with a determination that the trajectory of the object towards the touch sensor panel is a second trajectory, different from the first trajectory, selecting a second user interface element, different from the first user interface element, displayed by the display in response to determining that the object is the second distance from the touch sensor panel.

9. The touch controller of claim 8, wherein determining the identified touch location further comprises:

in accordance with the determination that the trajectory of the object towards the touch sensor panel is the first trajectory, identifying the object as a first finger based on at least the trajectory of the object towards the touch sensor panel; and in accordance with the determination that the trajectory of the object towards the touch sensor panel is the second trajectory, identifying the object as a second finger, different from the first finger, based on at least the trajectory of the object towards the touch sensor panel.

10. The touch controller of claim 1, wherein:

the touch controller is coupled to a display, and determining the identified touch location further comprises determining the identified touch location based on at least one or more user interface elements displayed by the display.

11. The touch controller of claim 10, wherein determining the identified touch location further comprises adjusting the predicted touch location based on respective likelihoods of selection of the one or more user interface elements.

12. A non-transitory computer readable storage medium storing one or more programs, the one or more programs comprising instructions, which when executed by a processor cause the processor to perform a method comprising:

sensing an object at a touch sensor panel;

when the object is a first distance from the touch sensor panel, determining a predicted touch location associated with the object on the touch sensor panel based on at least a trajectory of the object towards the touch sensor panel; and when the object is a second distance from the touch sensor panel, less than the first distance, determining an identified touch location associated with the object on the touch sensor panel based on at least the predicted touch location, wherein the identified touch location is different than the predicted touch location and a centroid of the object detected when the object is at the second distance from the touch sensor panel.

13. The computer readable storage medium of claim 12, wherein the predicted touch location of the object is different from the centroid of the object.

14. The computer readable storage medium of claim 12, the method further comprising:

when the object is a third distance from the touch sensor panel, between the first distance and the second distance, updating the predicted touch location based on at least an updated trajectory of the object towards the touch sensor panel.

15. The computer readable storage medium of claim 12, the method further comprising:

determining that the object is a first threshold distance from the touch sensor panel, wherein the first distance is less than or equal to the first threshold distance, wherein determining the predicted touch location associated with the object on the touch sensor panel is in response to determining that the object is the first threshold distance from the touch sensor panel.

16. The computer readable storage medium of claim 15, the method further comprising:

determining that the object is a second threshold distance, less than the first threshold distance, from the touch sensor panel, wherein the second distance is less than or equal to the second threshold distance, wherein determining the identified touch location associated with the object on the touch sensor panel is in response to determining that the object is the second threshold distance from the touch sensor panel.

17. The computer readable storage medium of claim 12, wherein:

determining the identified touch location comprises:

in accordance with a determination that the trajectory of the object towards the touch sensor panel is a first trajectory, selecting a first user interface element displayed by a display in response to determining that the object is the second distance from the touch sensor panel; and in accordance with a determination that the trajectory of the object towards the touch sensor panel is a second trajectory, different from the first trajectory, selecting a second user interface element, different from the first user interface element, displayed by the display in response to determining that the object is the second distance from the touch sensor panel.

18. The computer readable storage medium of claim 17, wherein determining the identified touch location further comprises:

in accordance with the determination that the trajectory of the object towards the touch sensor panel is the first trajectory, identifying the object as a first finger based on at least the trajectory of the object towards the touch sensor panel; and in accordance with the determination that the trajectory of the object towards the touch sensor panel is the second trajectory, identifying the object as a second finger, different from the first finger, based on at least the trajectory of the object towards the touch sensor panel.

19. The computer readable storage medium of claim 12, wherein determining the identified touch location further comprises determining the identified touch location based on at least one or more user interface elements displayed by the display.

20. The computer readable storage medium of claim 19, wherein determining the identified touch location further comprises adjusting the predicted touch location based on respective likelihoods of selection of the one or more user interface elements.

21. A method comprising:

sensing an object at a touch sensor panel;

when the object is a first distance from the touch sensor panel, determining a predicted touch location associated with the object on the touch sensor panel based on at least a trajectory of the object towards the touch sensor panel; and when the object is a second distance from the touch sensor panel, less than the first distance, determining an identified touch location associated with the object on the touch sensor panel based on at least the predicted touch location, wherein the identified touch location is different than the predicted touch location and a centroid of the object detected when the object is at the second distance from the touch sensor panel.

* * * * *